United States Patent
Aggarwal et al.

(10) Patent No.: US 10,591,931 B1
(45) Date of Patent: Mar. 17, 2020

(54) MANAGING OPERATIONS OF A MOBILE DRIVE UNIT WITHIN A WORKSPACE BASED ON A FIRE-BASED POLICY

(71) Applicant: Amazon Technologies, Inc., Seattle, WA (US)

(72) Inventors: Aayush Aggarwal, Medford, MA (US); Ryan Clarke, Manchester, NH (US); Anatoly Mitlin, Swampscott, MA (US); James Plumley, Pelham, NH (US); Gregory Edward Tierney, Chelmsford, MA (US); Steven Augustine Wilson, Sudbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 294 days.

(21) Appl. No.: 15/788,587

(22) Filed: Oct. 19, 2017

(51) Int. Cl.
  *G05D 1/02* (2006.01)
  *G05D 1/00* (2006.01)

(52) U.S. Cl.
  CPC ......... *G05D 1/0297* (2013.01); *G05D 1/0027* (2013.01); *G05D 2201/0216* (2013.01)

(58) Field of Classification Search
  CPC ............... G05D 1/0297; G05D 1/0027; G05D 2201/0216
  USPC .................................................. 700/245, 250
  See application file for complete search history.

(56) References Cited

U.S. PATENT DOCUMENTS

| | | | |
|---|---|---|---|
| 7,133,800 B2 * | 11/2006 | Delin | G01D 21/00 702/125 |
| 8,280,547 B2 | 10/2012 | D'Andrea et al. | |
| 9,205,886 B1 * | 12/2015 | Hickman | G05D 1/0246 |
| 9,488,984 B1 * | 11/2016 | Williams | G05D 1/0274 |
| 9,776,323 B2 * | 10/2017 | O'Sullivan | B25J 9/1666 |
| 9,994,434 B2 * | 6/2018 | High | G05D 1/0297 |
| 2001/0056544 A1 * | 12/2001 | Walker | B60R 25/02 726/2 |
| 2006/0208888 A1 * | 9/2006 | Patel | G07C 9/00111 340/572.1 |
| 2008/0105443 A1 * | 5/2008 | Molz | A62C 3/002 169/45 |
| 2011/0182703 A1 * | 7/2011 | Alan | E04H 6/183 414/231 |
| 2012/0143427 A1 | 6/2012 | Hoffman et al. | |
| 2013/0205889 A1 * | 8/2013 | Yu | G01M 99/002 73/168 |

(Continued)

*Primary Examiner* — Jaime Figueroa
(74) *Attorney, Agent, or Firm* — Kilpatrick Townsend & Stockton LLP

(57) ABSTRACT

Techniques for controlling movement of a mobile drive unit within a workspace are described. In an example, a system may access a map of the workspace. The map defines a policy for the movement of the mobile drive unit within the workspace based on a volume of the workspace associated with a fire shutter. The fire shutter is located within the workspace and is operable to manage a spread of a fire within the workspace. The system may generate at least a portion of a movement path for the mobile drive unit within the workspace based on the map and on an event for transporting material from a location in the workspace. The portion of the movement path is in compliance with the policy defined in the map. The system provides at least the portion of the movement path to the mobile drive unit over a data network.

20 Claims, 14 Drawing Sheets

(56) References Cited

U.S. PATENT DOCUMENTS

| | | | | |
|---|---|---|---|---|
| 2013/0215850 A1* | 8/2013 | Zakrzewski | ...... | H04W 52/0261 |
| | | | | 370/329 |
| 2014/0301810 A1* | 10/2014 | Steinbach | ............ | B65G 1/0421 |
| | | | | 414/273 |
| 2015/0066283 A1* | 3/2015 | Wurman | .............. | G05D 1/0214 |
| | | | | 701/25 |
| 2017/0144307 A1* | 5/2017 | Rublee | ................... | B25J 9/1676 |
| 2017/0313514 A1* | 11/2017 | Lert, Jr. | .................. | B65G 1/065 |
| 2017/0349039 A1* | 12/2017 | Rayner | ................... | B60L 53/68 |
| 2017/0372184 A1* | 12/2017 | Manci | ................ | G06K 19/0725 |
| 2017/0374511 A1* | 12/2017 | Buchmann | ............ | G06Q 50/28 |
| 2018/0044110 A1* | 2/2018 | Clarke | ................... | B65G 57/03 |
| 2018/0053141 A1* | 2/2018 | Shydo, Jr. | .............. | G05D 1/104 |

* cited by examiner

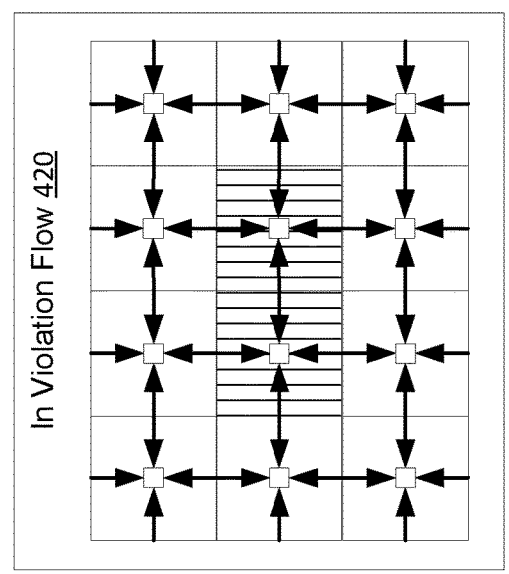
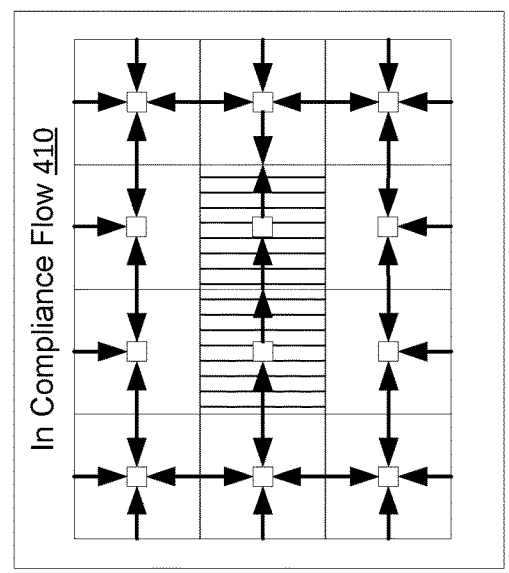
FIG. 4

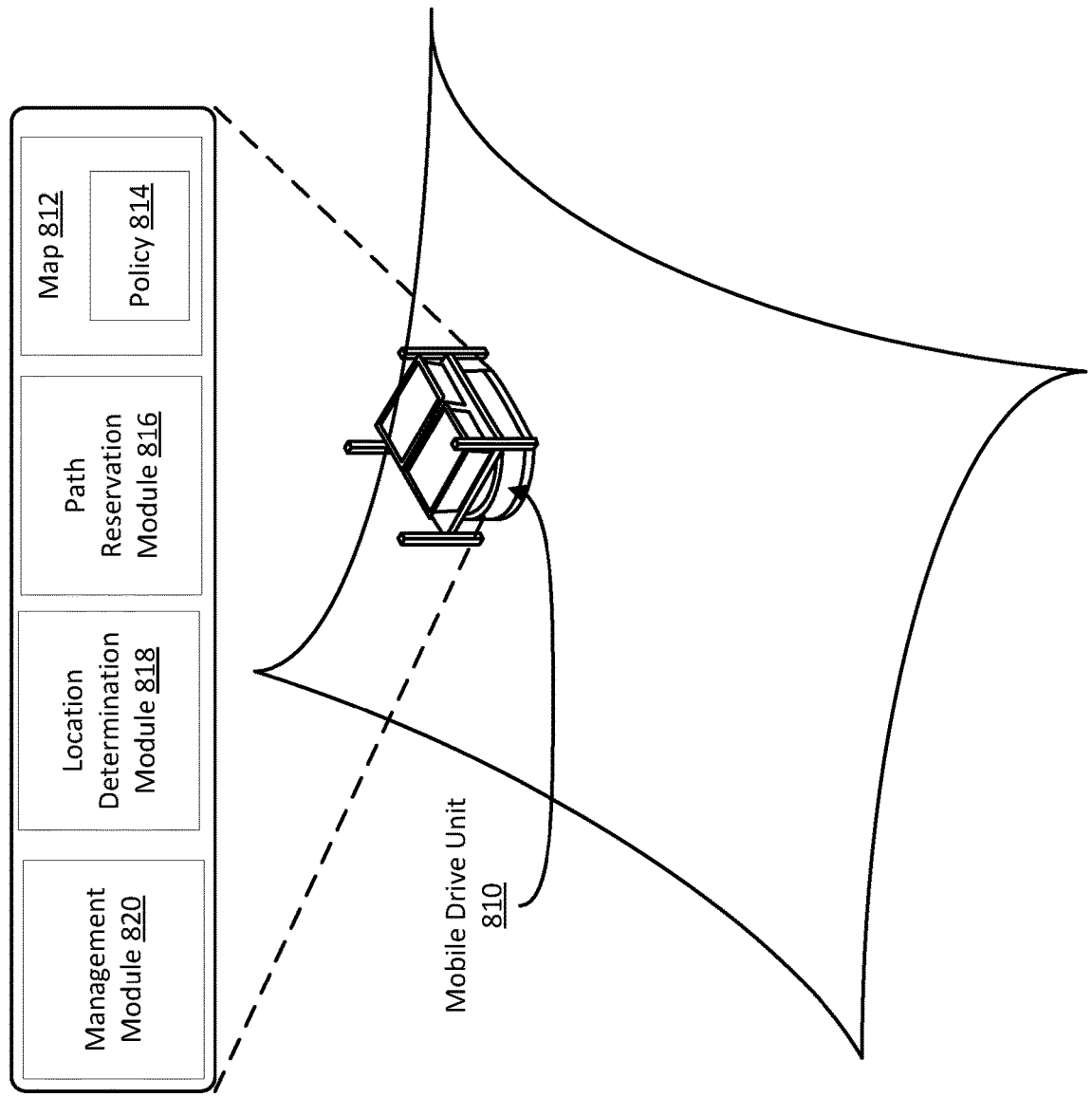

Access a map of a workspace, the map defining a policy for movement of a mobile drive unit within the workspace based at least in part a volume of the workspace associated with a fire shutter 902

Generate at least a portion of a movement path for the mobile drive unit within the workspace based at least in part on the map and on an event for transporting material from a location in the workspace 904

Provide at least the portion of the movement path to the mobile drive unit over a data network 906

Determine non-compliance of the movement of the mobile drive unit along the portion of the movement path 908

Instruct a second mobile drive unit to tow the mobile drive unit at a priority higher than a priority of material transportation based at least in part on the non-compliance and on the policy specifying the towing and the priority 910

FIG. 9

Determine information about a location of the mobile drive unit within a workspace that includes a fire shutter 1002

Determine at least a portion of a movement path within the workspace based at least in part on the information about the location and on a map 1004

Perform movement along the portion of the movement path 1006

Report non-compliance of the movement along the portion of the movement path 1008

Facilitate tow by a second mobile drive unit 1010

FIG. 10

Present a map of a workspace and an option to add a fire shutter to the map, the fire shutter represented with an object 1102

Update the map to add the object based a user selection of the option 1104

Provide an option to select a policy to apply to the map 1106

Update the map to indicate that the policy applies to a volume associated with the object representing the fire shutter 1108

Validate that the map is compliance with the policy 1110

Store the map in a data storage space 1112

Publish the map 1114

FIG. 11

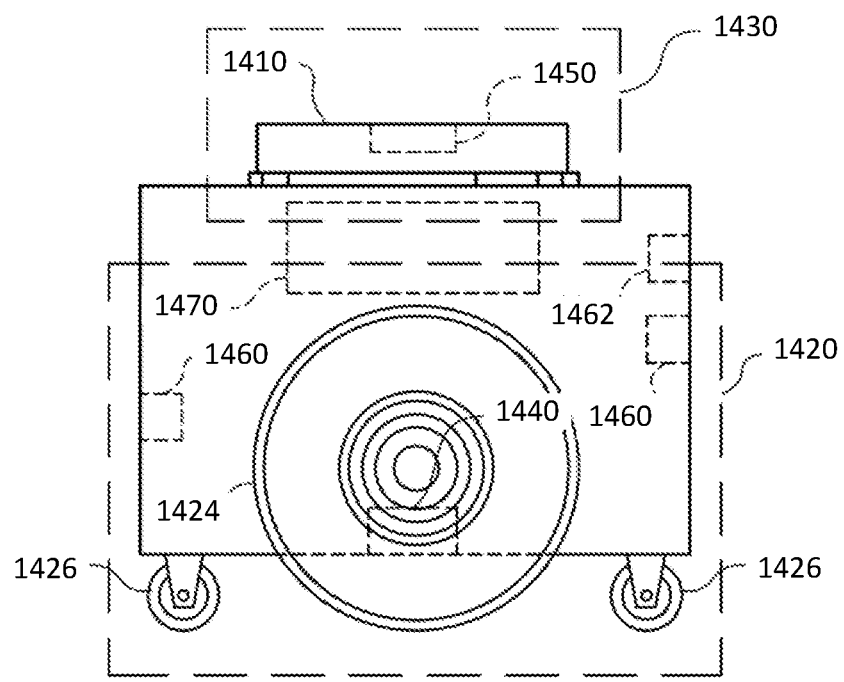
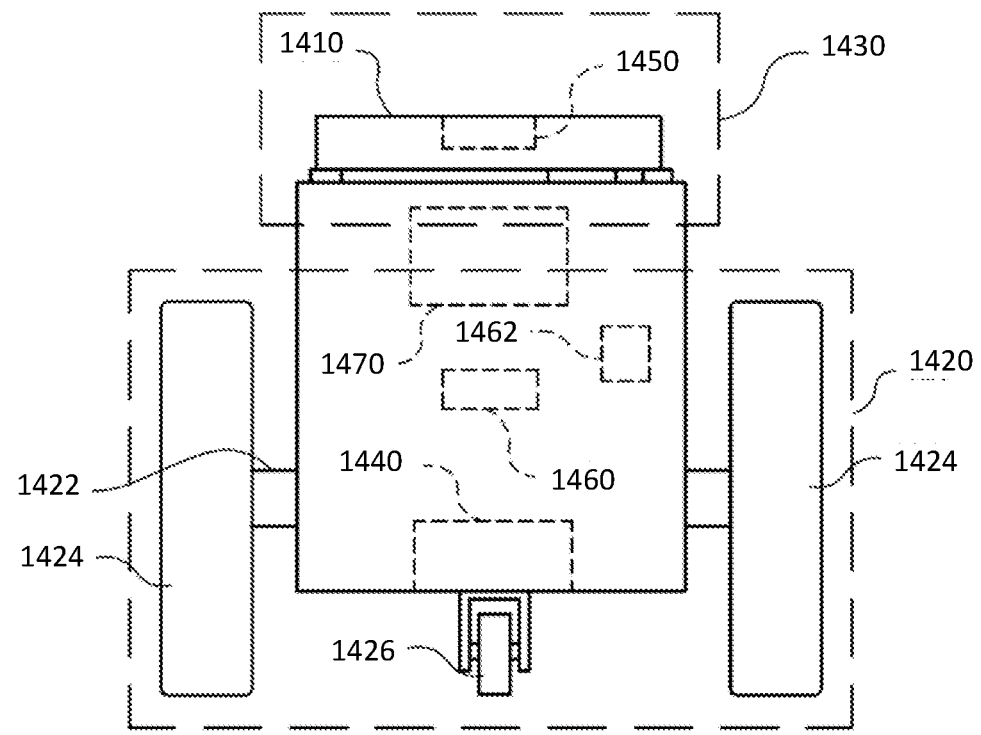
FIG. 14

MANAGING OPERATIONS OF A MOBILE DRIVE UNIT WITHIN A WORKSPACE BASED ON A FIRE-BASED POLICY

BACKGROUND

Modern inventory systems are deployed in workspaces, such as in mail order warehouses, supply chain distribution centers, airport luggage systems, and custom-order manufacturing facilities, and face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance.

To answer such challenges, many inventory systems rely on robots. For example, fully controlled, semi-controlled, or fully autonomous vehicles equipped with robotic manipulators are deployed within a workspace and are responsible to travel around the workspace and perform inventory-related tasks.

To ensure the proper operations of such inventory systems, various requirements may be imposed. For example, fire requirements can help improve the resilience of an inventory system to fire accidents. However, as the workspaces become more complex and the number of robots increases, meeting such requirements become more challenging. Absent compliance with the requirements, proper operations of the inventory systems may be at risk. In turn, efficient utilization of resources and optimized throughput may be at risk too.

BRIEF DESCRIPTION OF THE DRAWINGS

Various embodiments in accordance with the present disclosure will be described with reference to the drawings, in which:

FIG. 4 illustrates an example management of the flow of a mobile drive unit between volumes subject to fire-based sub-policies, according to certain embodiments of the present disclosure;

FIG. 8 illustrates an example of a mobile drive unit that autonomously moves within a workspace absent a grid of zones within the workspace, according to certain embodiments of the present disclosure;

FIG. 9 illustrates an example flow for using a map to control movement of a mobile drive unit, where the map defines a policy for the movement within a workspace and associates a volume of the workspace with the policy, according to certain embodiments of the present disclosure;

FIG. 10 illustrates an example flow for controlling movement of a mobile drive unit based on a map of a workspace and on a policy for the movement within a workspace, according to certain embodiments of the present disclosure;

FIG. 11 illustrates an example flow for generating a map that defines a policy associated with movement of a mobile drive unit within a workspace, according to certain embodiments of the present disclosure;

FIG. 14 illustrates an example mobile drive unit, according to certain embodiments of the present disclosure.

DETAILED DESCRIPTION

Figure 1:
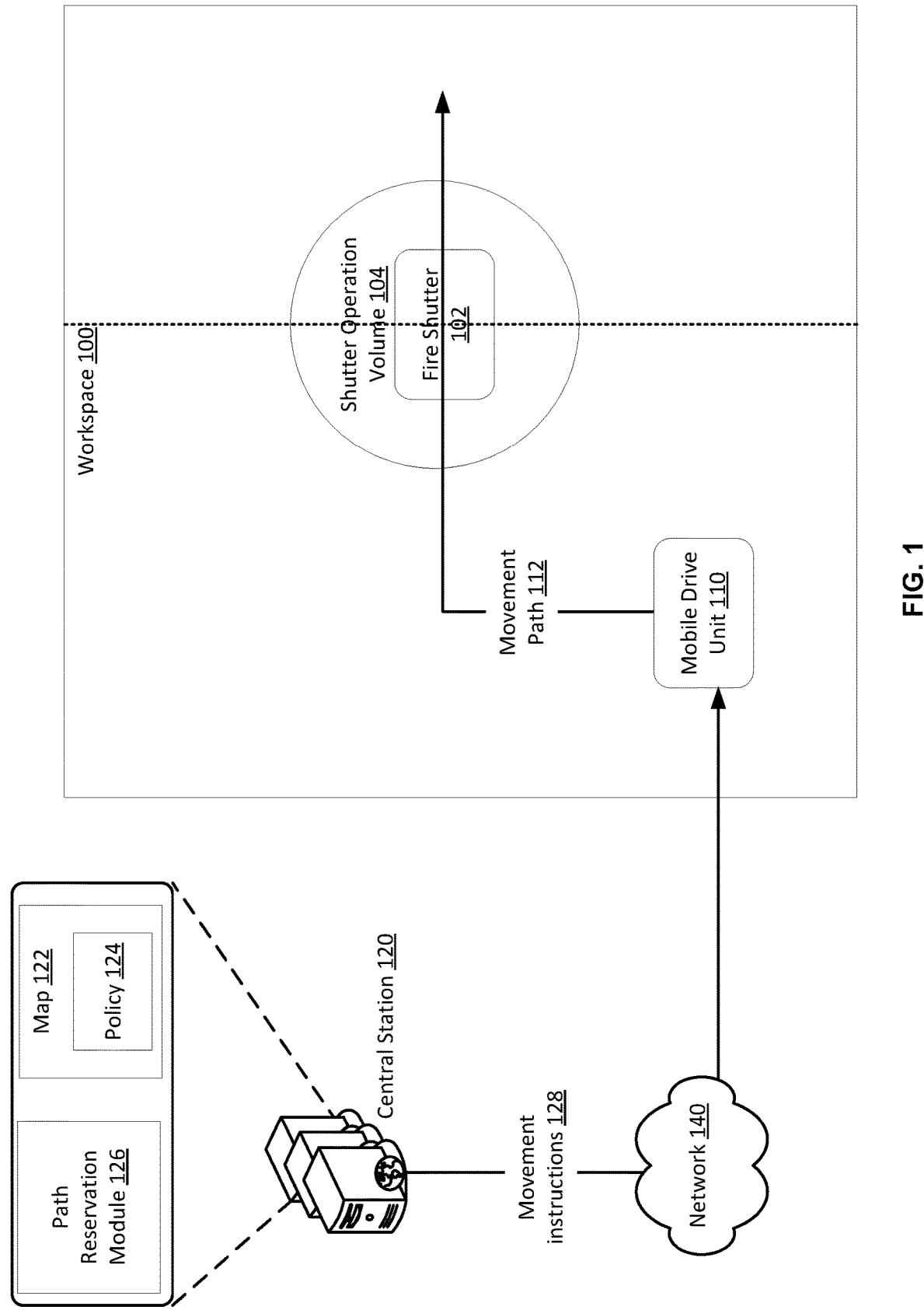
FIG. 1 illustrates an example environment where movement of a mobile drive unit within a workspace is managed based on a policy related to a fire requirement, according to certain embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system configured to manage mobile drive units for performing inventory-related tasks within a workspace. In an example, different requirements may be applicable to the workspace, including regulatory requirements and operator requirements. Fire requirements are an example of such requirements. To meet the fire requirements, the workspace may include fire shutters installed at various locations, thereby dividing the workspace into fire-sealable sections. In case of a fire, the fire shutters can be operable to isolate the sections within a certain time period and prevent a fire spread (e.g., within a minute, the fire shutters are transitioned from an open position to a shut position). In addition to using fire shutters, management of the mobile drive units may also account for the fire requirements. For example, the inventory systems may consider the locations, dimensions, and operations of the fire shutters in the management of the mobile drive units. The operations may be managed in situations when there is no fire (e.g., "normal operations") and in situations when one exists (e.g., "emergency operations"). In this way, the inventory system may be in compliance with the fire requirements at all times. More specifically, under normal operations, the mobile drive units may move around the workspace along specific movement paths designed to avoid blocking, storing inventory holders and inventory items, and/or increasing the density of traffic in or around volumes of the workspace that would be occupied by the fire shutters in an open position, a shut position, or a transition between the open and shut positions. In this way, if there is a sudden change from a normal operation to an emergency operation because of a fire, the fire shutters can be successfully operated (e.g. shut) without being blocked by mobile drive units, inventory holders, or inventory items. Once an emergency is in place, the mobile drive units may stop operations or move to specific areas within each isolated section of the workspace for cover.

To facilitate the management of the mobile drive units, a map of the workspace may be maintained and used. The map may represent the workspace as a set of volumes that includes objects (e.g., two dimensional or three dimensional models) of the fire shutters and various equipment (e.g., inventory stations, inventory holders, etc.) within the workspace. The objects may be organized in the map to reflect the physical dimensions, layouts, locations, operations, and locations of the fire shutters and equipment in the workspace. Further, the map may include a policy for movement of the mobile drive unit within the workspace based on volumes of the workspace, where these volumes are associated with fire shutters. Each volume may correspond to a physical volume that a fire shutter occupies in an open position, a shut position, or a transition between the open and shut positions. The map may indicate the volumes of the workspace where the policy applies. In this way, the policy may be used to manage the movement of the mobile drive units within these volumes under normal operations. Another policy may be similarly defined for the emergency operations. This policy may, for example, identify cover volumes within each section of the workspace where the mobile drive units should move to in case of a fire. Accordingly, each of the mobile drive units may be instructed to follow a movement path along the workspace, where each portion along the movement path may be in compliance with the policy.

To illustrate, consider an example of an inventory system that includes a central system and a mobile drive unit. The central system is usable to manage movement of this mobile drive unit within a workspace that includes a fire shutter. Of course, this example similarly applies to situations where a larger number of mobile drive units and/or fire shutters are used. The floor of the workspace is divided into cells having predefined dimensions (e.g., forty inches×forty inches). Each cell includes a fiducial that identifies the cell (e.g., a marker, like a barcode, that encodes the identifier of the cell). A policy may be defined to include three sub-policies. The first sub-policy may specify that movement of the mobile drive unit and storage of material is prohibited in a cell with which any portion of the fire shutter intersects in an open position. The second sub-policy may specify that stoppage of the mobile drive unit is prohibited in a cell with which any portion of the fire shutter intersects in an shut position or while transitioning between the open and shut positions. The third sub-policy may indicate that the cell subject to the second sub-policy and an adjacent cell thereto in the direction of the movement of the mobile drive should be free of any other mobile drive units or material while the mobile drive unit moves through these cells. A map may be defined and accessible to the central system. The map may represent the cells and the fiducials and may identify the location of the fire shutter relative to the cells. The map may also identify the cells that are affected by the policy and may mark each of such cells with the applicable sub-policy. In this way, the movement of the mobile drive unit within the workspace may be managed based on the policy defined in the map.

More specifically, the central system generates a movement path for the mobile drive unit to move between two locations of the workspace. The movement path may identify the cells that the mobile drive unit should travel and may indicate the specific cells that the mobile drive unit cannot enter (e.g., based on the first sub-policy) and cannot stop at (e.g., based on the second sub-policy). The central system reserves the cells for the mobile drive unit over multiple time periods (e.g., one time period per reserved cell) and may prohibit the reservation of a specific cell for another mobile drive, where this cell is affected by the third sub-policy unit during the relevant time period. The central system may send instructions about the reserved movement path to the mobile drive unit. The instructions may identify the cells associated with the movement path and the allowed and prohibited operations in each cell (e.g., movement, stoppage, storage, pickup, etc.). The mobile drive unit may receive the instructions and start its movement. Upon arrival to a cell, the mobile drive unit may read the relevant fiducial, identify the cell, and perform an applicable operation as instructed (e.g., move to the next cell, stop movement, or store or pickup an inventory holder, etc.).

Although this example illustrates centralized management, other inventory systems can also be decentralized (e.g., each mobile drive unit autonomously computes its movement path) or distributed (e.g., the computation of the movement path is distributed between the central system and the mobile drive units). Such systems are further described in connection with the next figures.

In the interest of clarity of explanation, various embodiments of the present disclosure are described in connection with a workspace for item inventorying, movement of mobile drive units, and fire requirements. However, the embodiments are not limited as such and similarly apply to any workspace, robot, operations of a robot, and requirement with which compliance can be impacted by an operation of the robot. The operation may rely on mobility of the robot within the space and can involve, for example, movement of the robot or movement of an arm of the robot such as to pick up, handle, transport, and/or store material within the space. Generally, a map of the space can be defined and used to manage the operation. The map may include or refer a policy developed to manage the operation in view of the requirement, and indications of the volumes within the space where the policy is applicable.

FIG. 1 illustrates an example environment where movement of a mobile drive unit within a workspace is managed based on a policy related to a fire requirement. The environment may include a workspace 100, a mobile drive unit 110 configured for material transportation within the workspace 100, and a central station 120. The workspace 100 may represent a space where items may be inventoried. The mobile drive unit 110 may transport items in and out of the workspace 100 and between locations of the workspace 100. The central station 120 may be configured to manage various aspects of the inventorying such that the central stations 120 and the mobile drive unit 110 may represent an inventory system.

As illustrated, the workspace 100 may include a fire shutter 102 to meet fire requirements. The fire shutter 102 may be operated in an emergency (e.g., in case of a fire) to isolate sections of the workspace 100. For instance, the fire shutter 102 is installed as a door that is made with fire resistant and isolation material and that separates two sections of the workspace (illustrated with a dotted line). The door may remain open during normal operations. In emergency operations, the door may be shut to prevent the spread of the fire. In this way, if a fire occurs in the right hand section of the workspace 100, the fire shutter 102 may be contained the fire in that section and protect the right hand section of the workspace 100.

The fire shutter 102 may be used in various operational states. In an open state, the fire shutter 102 may remain open such that the mobile drive unit 110 may travel between the two sections. In a shut state, the fire shutter 102 may be shut to prevent the spread of fire, thereby blocking the travel of the mobile drive unit 110. In a transition state, the fire shutter 102 may transition from the open state to the shut state, or vice versa. The transition state may occur over a period of time that meets the fire requirement (e.g., within a minute of a fire alarm, the fire shutter 102 needs to be shut). During that period of time, movement or proximity of the mobile drive unit 110 to the fire shutter 102 may not be permitted.

Different types of the fire shutter 102 may be used, each of which may be designed to meet the fire requirements. Garage style, sliding, and swinging fire shutters are possible. Generally, the fire shutter has certain dimensions (e.g., height, width, and thickness) that occupy a volume within the workspace. This volume is illustrated as a "shutter operation volume" 104 in FIG. 1. The shutter operation volume 104 may include all areas along the X, Y, and Z coordinates that any portion of the fire shutter 102 may occupy in the open, shut, and transition states. Storage of inventory holders or inventory items and presence of the mobile drive unit 110 in the shutter volume operation 104 may impact the proper operations of the fire shutter 102 in case of a fire emergency. Accordingly, a policy 124 may be defined to manage the operations (e.g., the movement, storage, pick-up, etc.) of the mobile drive unit 110 and the presence or absence of inventory holders and inventory items within the shutter operation volume 104 at all times. This policy is further described in connection with the central station 120.

The mobile drive unit 110 may represent a robot that is capable of movement around the workspace 100 and of performing operations at various locations. For instance, this robot may pick up an inventory item, or an inventory holder that stores one or more inventory items, from one location of the workspace 100, travel along a movement path 112, and securely release the inventory item or inventory holder at a second location of the workspace 100.

In an example, the mobile drive unit 110 may receive and execute instructions about these operations from the central station 120. In this way, the mobile drive unit 110 may be under full control of the central station 120. In another example, the mobile drive unit 110 may autonomously (e.g., independently of the central station 120) generate the instructions for execution. In this way, the mobile drive unit may autonomously operate. In yet another example, some of the instructions may be generated by the mobile drive unit 110 and remaining instructions may be generated by the central station 120. In this way, the mobile drive unit 110 may be semi-controlled by the central station 120. Further description of maintaining full control, semi-control, or autonomous control is provided in connection with the next figures.

The central station 120 may represent a computer system, such as a server or computing resources within a datacenter, that hosts various modules to support various inventory-related operations. For example, the central station 120 may instruct the mobile drive unit 110 to move an inventory item or an inventory holder between locations of the workspace 100, store an inventory item, discard an inventory item, and/or perform other inventory-related tasks. Further, depending on the whether full, semi, or autonomous control is implemented, the central station 120 may reserve the movement path 112 for the mobile drive unit 110 for a time period and may instruct the mobile drive unit 110 to move along this path 112 within the time period.

In an example, the central station 120 may send the relevant instructions to the mobile drive unit 110 over a data network 140 based on a trigger. The data network 140 may include a communication network that implements various communication protocols. The trigger may include an event related to an inventory task. For instance, the event may include a consumer order for an inventoried item. This event may trigger the transportation of material (e.g., the inventory item placed in an inventory holder) from a location in the workspace to another location.

To support the above operations, the central station 120 may store (or have access to a remote storage location that stores) a map 122. The map 122 may identify the volumes in the workspace 100, including the shutter operation volume 104, may include or refer the policy 124, and may associate a subset of the volumes with the policy 124. In an example, the map 122 may store the policy 124 as a set of instructions. In another example, the map may include a referrer to the policy 124, such as a network storage address (e.g., a uniform resource location (URL)) of a network location that stores the policy 124. Each of volumes may be represented as an object in the map 122. The map 122 may tag or label each of the objects with data of whether the policy 124 is applicable or not and, if applicable, the particular sub-policy(ies) that should be met.

In an example, the central station 120 may host a path reservation module 126 configured to generate and reserve the movement path 112 for the mobile drive unit 110 based on the map 122. The module 126 may be implemented as specialized hardware or as general hardware configured according to a specific set of instructions. The movement path 112 may be generated such that movement and operations of the mobile drive unit 110 along the various portions of the movement path 112 are in compliance with the policy 124. For instance, if the policy 124 is marked as applicable to the shutter operation volume 104, the movement and operations of the mobile drive unit 110 through that volume 104 may be compliance with the policy 124. In this way, if the policy specifies that the mobile drive unit 110 may not stop within the shutter operation volume 104, may not enter a particular portion of the shutter operation volume 104, and/or may not store material in the particular portion, the movement path 112 and the instructions provided to the mobile drive unit 110 may reflect these specifications of the policy 124. The policy 124 may store various types of policies (which, may be referred to as sub-policies) as further described in connection with the next figures.

In the case of full control, the map 122 and path reservation module 126 may be accessible to (e.g., stored and hosted on) the central station 120. In the case of autonomous control, the map 122 and path reservation module 126 may be directly accessible to the mobile drive unit 110. In the case of semi-control, each of the central station 120 and mobile drive unit 110 may have direct access to the map 122 and/or path reservation module 126. These variations are further described in the next figures.

Hence, based on an event, the mobile drive unit 110 may travel along the movement path 112 through the fire shutter 102 to transport material between locations of the workspace 100. Further, while in the shutter operation volume 104, the movement and operations of the mobile device 110 may be in-compliance with the policy 124. In this way, if an emergency arises and the fire shutter 102 transitions from the open state to the shut state, the movement and operations of the mobile drive unit 110 do not jeopardize the transition. Accordingly, containing the fire may not be at risk because of the mobility of the mobile drive unit. In other words, the operations of the inventory system may not be at risk because of the mobility of the mobile drive unit. In turn, efficient utilization of resources and optimized throughput may not be at risk either.

Figure 2:
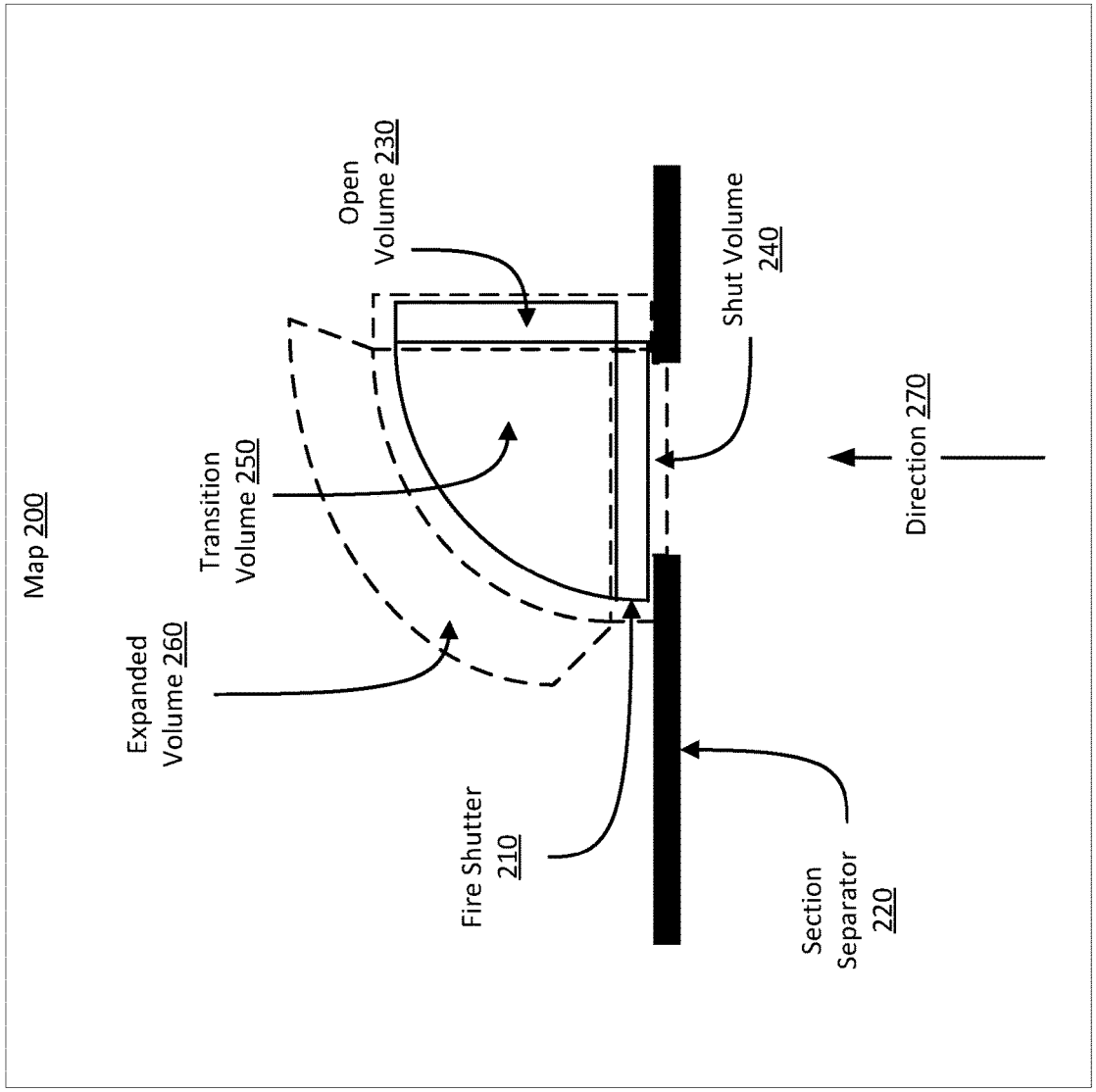
FIG. 2 illustrates an example map that defines a fire-based policy to manage operations of a mobile drive unit within a workspace, according to certain embodiments of the present disclosure.

FIG. 2 illustrates an example map that defines a fire-based policy to manage operations of a mobile drive unit within a workspace. A map 200 may correspond to a workspace, such as the workspace 100 of FIG. 1. The map 200 may include a policy usable to manage the operations, including the movement, of a number of mobile drive units within the workspace. In an example, the policy may include a number of sub-policies, such as a "reject all policy," a "no stop policy," and a "limit number policy" applicable to certain volumes of the workspace associated with a fire shutter. Each of these sub-policies is further described herein below.

As illustrated, the map 200 may be a two dimensional virtualization of the workspace, where the virtualization identifies objects of the workspace. Of course, higher dimensional (e.g., three dimensional) maps may be defined and used. Each object may correspond to equipment, such as a fire shutter, an inventory holder, an inventory station, section separators (e.g., walls), or other equipment of the workspace or to a physical space in which operations of mobile drive units can occur. Each object may be identified in the map 200 relative to a location in the map 200.

The map 200 may show the locations of a fire shutter 210 (and, similarly, other objects) relative to a section separator 220 (e.g., a wall), the type of the fire shutter 210, and the volumes that the fire shutter 210 occupies in an open position (shown with the open volume 230 in FIG. 2), shut position (shown with the shut volume 240 in FIG. 2), and transition between the open and shut positions (shown with the transition volume 250 in FIG. 2). These volumes 230-260 may be defined as a function of the configuration (e.g., dimensions, shutting mechanism, etc.) of the fire shutter 210. For example, if a volume in space would be occupied by the fire shutter 210 in the open position, that volume is part of the open volume 230. Similarly, another volume in space would be occupied by the fire shutter 210 in the shut position, that volume is part of the shut volume 240. Likewise, if an additional volume in space would be occupied by the fire shutter 210 in the transition state, that volume is part of the transition volume 250. Of course some margins (e.g., +5%) may be defined around these volumes.

Further, the map 200 may show an expanded volume 260 around the transition volume 250. This expanded volume 260 may be statically or dynamically defined as a function of the dimensions of a mobile driving unit moving through the transition volume 250 and the direction 270 of this movement. For instance, the expanded volume 260 may represent an expansion of the transition volume 250 by the maximum mobile drive unit dimension in each possible direction of movement allowed without stopping. As further described herein below, the expanded volume 260 may be used to ensure the mobile drive unit does not stop in the transition volume 250 while waiting for another mobile drive unit to move out of the expanded volume 260.

Because the fire shutter 210 occupies the open volume 230 in the open position, the map 200 marks this volume 230 with an identifier indicating that the "reject all policy" applies thereto. Because the fire shutter occupies the shut volume 240 in the shut position and the transition volume 250 in the transition state, the map 200 marks these two volumes 240 and 250 with an identifier indicating that the "no stop policy" applies thereto.

The "reject all policy" may prohibit movement of a mobile drive unit and storage of material within the marked open volume 230. That is because the fire shutter may typically be in the open position occupying the open volume 230 and, thus, preventing the use of this volume 230. In comparison, the "no stop policy" specifies that the movement of the mobile drive unit is permitted and stoppage of the mobile drive unit is prohibited within the marked volumes 240 and 250. That is because the fire shutter may not properly transition between open and shut and may not properly shut if the mobile drive unit was stopped in these shut volume 240 or the transition volume 250.

The "no stop policy" may only be effective if the "limit number policy" is applied to the expanded volume 260. The "limit number policy" may specify a limit on a number of mobile drive units permitted to occupy the expanded volume 260 while the mobile drive unit is in the volumes 240 or 250 subject to the "no stop policy." Otherwise, the mobile drive unit may need to stop in the shut volume 240 or transition volume 250 until the expanded volume 260 becomes available for the mobile drive unit, thereby violating the "no stop policy." Accordingly, the map 200 marks the expanded volume 260 with an identifier indicating that the "limit number policy" applies thereto.

Of course, other types of sub-policies may be possible to define and use in the map 200. In an example, a maximum speed within a volume may be defined. For instance, the speed of the mobile drive unit may be increased while going through the transition volume 250 to reduce the risk of the mobile drive unit blocking the fire shutter in the transitions. In an example, a sub-policy may specify that a priority to tow a mobile drive unit or any equipment or material that is improperly present (e.g., a mobile drive unit that stalls or fails) in a volume marked with the "reject all policy, "no stop policy," and/or "limit number policy." The priority may be higher than that of a priority of material transportation. In this way, towing away a non-compliance mobile drive unique, equipment, or material can have a higher priority than transporting material. In an example, this "tow policy" may override the "no stop policy" and "limit number policy" for at least the towing mobile drive unit because the towing operations may necessitate stoppage and would involve two mobile drive units (the towing and the towed units).

Hence, a movement path may be defined for a mobile drive unit based on the map 200. The movement path may identify the sequence and timing of the volumes that the mobile drive may follow. The movement path may also identify the volumes subject to the different sub-policies. In this way, the mobile drive unit may follow the sequence according to the timing and the sub-policies to travel through the volumes and perform applicable inventory-related tasks while being compliant with the various sub-policies.

Figure 3:
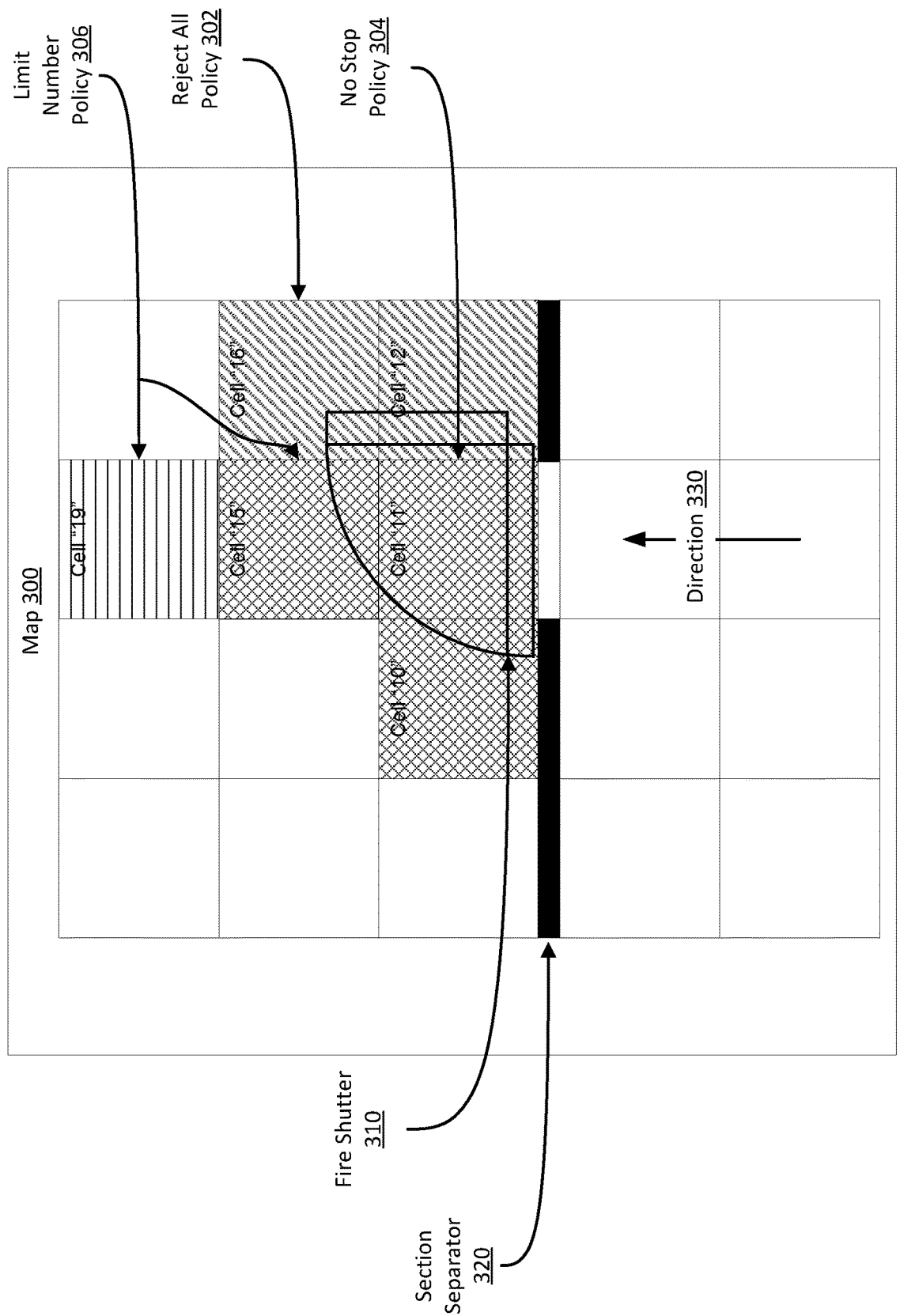
FIG. 3 illustrates another example map that defines a fire-based policy to manage operations of a mobile drive unit within a workspace, according to certain embodiments of the present disclosure.

FIG. 3 illustrates another example map that defines a fire-based policy to manage operations of a mobile drive unit within a workspace. A map 300 may correspond to a workspace, such as the workspace 100 of FIG. 1. The map 300 may include a policy usable to manage the operations, including the movement, of a number of mobile drive units within the workspace. As illustrated, the policy may include a number of sub-policies, such as a "reject all policy 302," a "no stop policy 304," and a "limit number policy 306" applicable to certain volumes of the workspace associated with a fire shutter.

As illustrated, the map 300 may be a two dimensional virtualization of the workspace, where the virtualization identifies objects of the workspace. Of course, higher dimensional (e.g., three dimensional) maps may be defined and used. Each object may correspond to equipment, such as a fire shutter, an inventory holder, an inventory station, section separators (e.g., walls), or other equipment of the workspace or to a physical space in which operations of mobile drive units can occur. Each object may be identified in the map 300 relative to a grid of cells. Each cell may represent a particular footprint within the workspace, such as a forty inches by forty inches footprint (or some other dimensions) and may be given a unique identifier (e.g., a numerical value unique to the cell). The collection of the cells (e.g., the grid) may represent a coordinate system for identifying volumes of the workspace. For instance, cell "11" (starting from the bottom left of the figure) may identify a volume that would be occupied by a portion of the fire shutter in a transition state.

The map 300 may show the locations of the objects in the cell and may identify the cells that are subject to a policy and the applicable sub-policy(ies). For example, the map 300 may include an object representing a fire shutter (illustrated as fire shutter 310) and an object representing a wall (illustrated as a section separator 320). Each of the objects may be dimensioned and marked according to the physical dimensions of and the volume the corresponding equipment actually occupies in the various operational states. For instance, the fire shutter may be dimensioned and shown in the map 300 in the open position (illustrated with the vertical lines), shut position (illustrated with the horizontal lines), and the transition between the open and shut positions (illustrated with the arc line in addition to the vertical and horizontal lines).

Because the fire shutter occupies a portion of the volumes represented by cells "12" and "16" in the open position, the map 300 marks these cells with an identifier indicating that the "reject all policy" 302 applies thereto. In this way, no mobile drive unit can use these two cells, thereby ensuring that the fire shutter can operate properly in the open position.

Because the fire shutter occupies a portion of the volume represented by cells "10," "11," and "12" in the shut position, the map 300 marks this cell with an identifier indicating that the "no stop policy" 304 applies thereto. Similarly, because the fire shutter occupies a portion of the volumes represented by cells "10," "11," "12," and "15," and "16" in the transition state, the map 300 marks these cells with an identifier indicating that the "no stop policy" 304 applies thereto. In this way, no mobile drive unit can stop in these cells, thereby ensuring that the fire shutter can transition from the open position and shut properly. However, because cells "12" and "16" are already subject to the "reject all policy" 302, that policy may override the "no stop policy" 304 for these cells. Accordingly, cells "12" and "16" need not be marked as being subject to the "no stop policy" 304.

The "reject all policy" 302 may prohibit movement of a mobile drive unit and storage of material within the marked volumes. That is because the fire shutter may not be properly open and may not be shut unless these volumes are clear. In comparison, the "no stop policy" 304 specifies that the movement of the mobile drive unit is permitted and stoppage of the mobile drive unit is prohibited within the marked volumes. That is because the fire shutter may not properly transition between open and shut if the mobile drive unit was stopped in these volumes.

The "no stop policy" 304 may only be effective if the "limit number policy" 306 is applied to specific cells. More specifically, the application of the "limit number policy" 306 may be defined relative to a direction 330 of traffic and the cells subject to the "no stop policy" 304 (e.g., cells "10," "11," and "15" in FIG. 3). The "limit number policy" 306 may be applied to these cells and to an adjacent cell in the direction 330 (e.g., the adjacency is defined relative to the direction). In the illustration of FIG. 3, the "limit number policy" is applied to cell "19" which is adjacent to cell "15" in the direction 330. In addition, the cells "10," "11," and "15" are subject to the "limit number policy" 306. The "limit number policy" 306 may specify a limit on a number of mobile drive units permitted to occupy the volume(s) marked with this policy 306. For instance, while the mobile drive unit is in cell "15" and moving in the direction 330, at least cells "15" and "19" should be clear of any other mobile drive units and material. In this way, the mobile drive unit would not stop in cell "15" (which is subject to the "no stop policy" 304) before it can enter cell "19."

Of course, other types of sub-policies may be possible to define and use in the map 300. In an example, a maximum speed policy and a towing policy may be defined as explained herein above in connection with FIG. 2.

Hence, a movement path may be defined for a mobile drive unit based on the map 300. The movement path may identify the sequence and timing of the cells that the mobile drive may follow. The movement path may also identify the cells subject to the different sub-policies. In this way, the mobile drive unit may follow the sequence according to the timing and the sub-policies to travel through the volumes corresponding to the cells and perform applicable inventory-related tasks while being compliant with the various sub-policies.

In the illustrative examples of FIGS. 2 and 3, a map defining a policy may be dynamically updated based on a trigger. In an example, the trigger may be an emergency (e.g., a fire). For instance, in case of an emergency, the map may be automatically updated to reflect a number of changes to ensure proper emergency operations. One change may relate to the marking of the volumes with sub-policies. For example, a volume now occupied by the fire shutter in the shut position (e.g., shut volume 240 in FIG. 2 and cell "10" in FIG. 3) may be remarked from being subject to a "no stop policy" to a "reject all policy." In this way, operations to re-open the fire shutter can be properly performed. Another change may relate to sectioning the map. While the emergency is ongoing, a fire shutter may remain shut, thereby dividing a space into two sections. Movement of a mobile drive unit located in one section may then be constrained to that section. Hence, any movement path reservation for that mobile drive unit may be limited to the section and may not traverse the fire shutter. Accordingly, a computing system generating the movement path (whether hosted on a central station or on the mobile drive unit), may localize the movement path to the section. In an example, sectioning the map may include generating multiple maps (or layers of the map), where each generated map (or layer) corresponds to a section. The computing system may then use the generated map (or layer) for the section where the mobile drive unit is located.

Once a map is defined for a workspace and identifies applicable sub-policies, the map may be used to generate a flow of mobile drive units within the workspace. The flow may represent the sequence and timing of a mobile drive unit moving through different volumes within the workspace. Some of these volumes may be subject to one or more of the sub-policies. Hence, the mobile drive unit need not only be compliant with the sub-policies when being located in each of these volumes, but its flow in, out, and through these volumes should also be in compliance with these sub-policies.

In an example, the flow may also consider the impact of a certain operations of the mobile drive unit to the compliance with the "no stop policy" and "limit number policy." More specifically, the flow may exclude any volume subject to the "reject all policy." Further, if moving in, out, or through a particular volume subject to the "no stop policy" necessitates stoppage, the flow may exclude such movement. To illustrate, the flow may define a change in direction of the mobile drive unit while in the particular volume. However, the change of direction may necessitate the mobile drive unit stopping to perform a rotation. Hence, this flow would result in a violation of the "no stop policy" applicable to the particular volume. Instead, the flow may be updated such that the mobile drive unit changes its direction once it leaves the particular volume. In addition, the flow may ensure that when the mobile drive unit is moving through a volume subject to the "limit number policy," the maximum number of mobile drive units in that space is observed.

FIG. 4 illustrates an example flow of a mobile drive unit through a workspace having a map having cells marked with a "no stop policy." The example flow is similarly applicable to any other type of maps and to any other types of policy. In an example, a movement path is generated for the mobile drive unit. The movement path may necessitate movement of the mobile drive unit through various volumes of a workspace. The volumes may be represented as cells in the map. The movement indicates a flow through the volumes, and may be referred to as a movement flow 400. FIG. 4 further illustrates two movement flows: one in compliance (shown as in compliance flow 410) and one in violation (shown as in violation flow 420) of the "no stop policy." Accordingly, the movement flow 400 would be set to the in compliance flow 410 by a computer system.

As illustrated, cells patterned with straight lines indicate the corresponding volumes are subject to the "no stop policy." The movement flow 410 may be in compliance because the mobile drive unit moves through the two cells subject to the no "stop policy" in one direction, thereby avoiding the need to stop and rotate to change direction. In comparison, the movement flow 420 may be in violation because the mobile drive unit may stop to change direction in any of these two cells.

Figure 5:
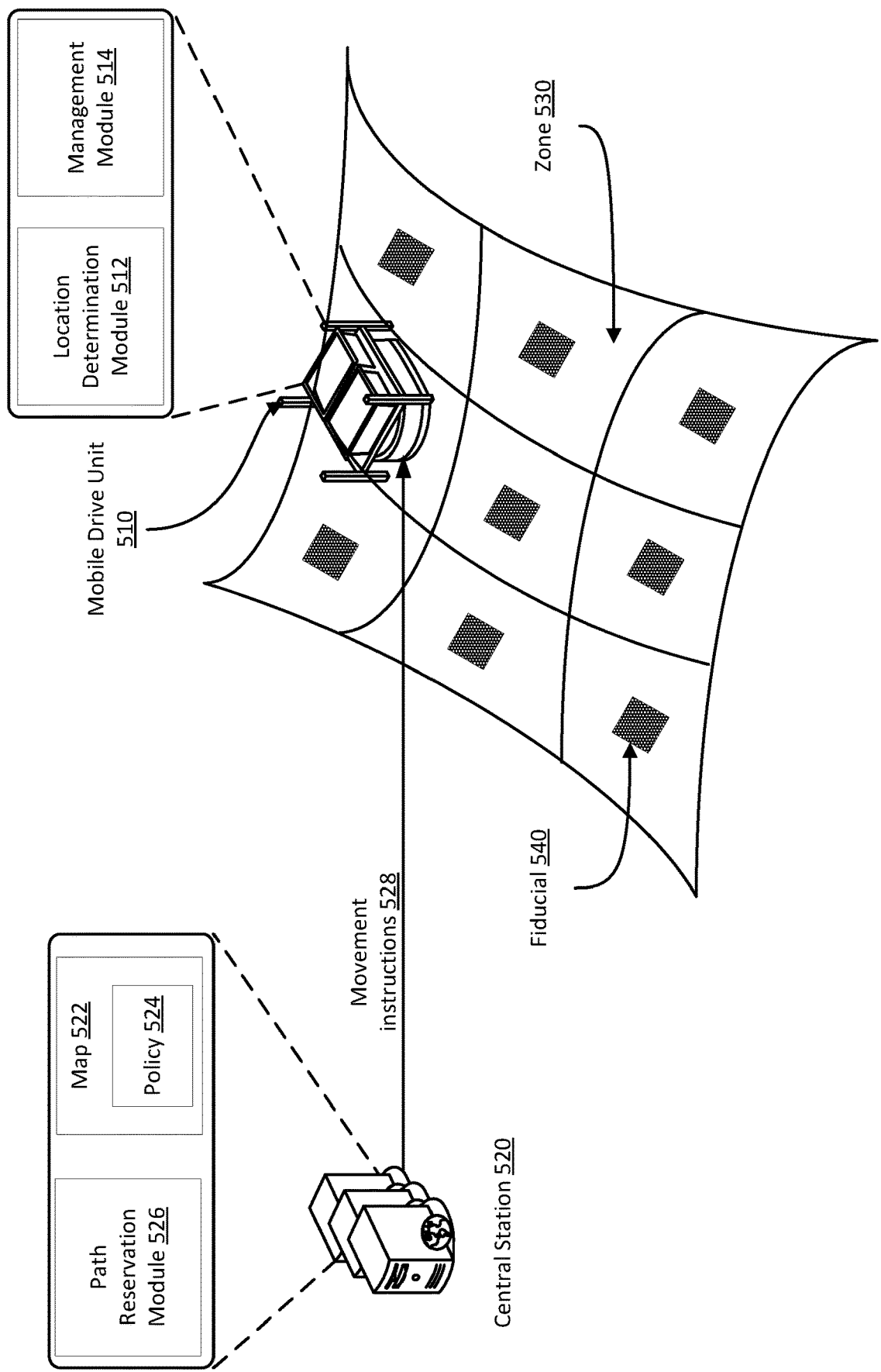
FIG. 5 illustrates an example of a central station that generates and reserves a movement path for a mobile drive unit based on a map that defines a policy, according to certain embodiments of the present disclosure.

FIG. 5 illustrates an example of a central station 520 that generates and reserves a movement path for a mobile drive unit 510 based on a map 522, where the map 522 defines a policy 524. The floor of the workspace where the mobile drive unit 510 is operational may be divided in a grid of zones. Each zone corresponds to a volume of the workspace and may be represented as a cell in the map 522. The grid may be used as a coordinate system or navigation plan to instruct the movements and operations of the mobile drive unit 510.

A zone can have particular dimensions, such as a square with a forty inch side (or a side within the range of thirty to fifty inches), or any other geometric shape and dimensions. In an example, the zones may be equally sized. In another example, the zones may have variable sizes. In this case, the map 522 may be a multi-layer map. Each of the layers may correspond to a particular size (e.g., a layer for "forty by forty inch" zones, another layer for a "thirty by fifty inch" zones, etc.). At each layer, the map 522 may identify how the policy 524 applies to the zones by marking the cells of the layer.

Each zone can also be identified with a particular identifier (e.g., a numeric value unique to the cell). The identifier of a zone may be encoded in a fiducial 540 that is affixed to the zone (e.g., installed in the center of the zone). In an example, the identifier may be a relative location of the zone within the workspace (e.g., X, Y coordinates of the center of the zone, location of the zone within the grid, etc.). In another example, the identifier may be a different value that uniquely identifies the zone but not necessarily its location within the grid. In this case, the fiducial 540 may also encode the relative location.

In an example, a path reservation module 526 of the central station 520 may look-up the map 522 to reserve a movement path for the mobile drive unit 510 and may generate movement instructions 528 accordingly. For instance, the path reservation module 526 may identify, from the map 522, the sequence of zones 530 that the mobile drive unit 510 should follow and, for each zone, may specify the time period for traveling through the zone. The path reservation module 526 may reserve the zones for the mobile drive unit 510 during the corresponding time periods such that these zones may not be allocated or used by another mobile drive unit during these time periods. In an example, the mobile drive unit may request from the path reservation module 526 whether movement to a zone may be permitted. The path reservation module 526 may act as a space allocator, allocate the zone to the mobile drive unit for a period of time based on the map 522 and the flow of other mobile drive units, and may respond to the request with instructions about the zone being allocated.

Further, the movement path may be in compliance with the policy 524 defined in the map 522. In particular, when reserving a zone, the path reservation module 526 may check whether any sub-policy is applicable to the corresponding cell in the map 522. If so, the path reservation module 526 may generate the movement path to meet the various sub-policies and may instruct the mobile drive unit 510 accordingly.

For example, if a cell is marked with a "reject all policy," the path reservation module 526 may exclude the corresponding zone from the movement path. Optionally, the path reservation module 526 may identify the zone and instruct the mobile drive unit 510 to not enter the zone.

In another example, if a cell is marked with a "no stop policy," the path reservation module 526 may include the corresponding zone in the movement path if doing so meets co-linearity and/or bi-directionality policies (or more generally, if the sequence of zones would avoid the mobile drive unit stopping in this zone). The movement instructions 528 may identify the zone and instruct the mobile drive unit 510 not to stop in it. Alternatively, rather than identifying the zone, the movement instructions 528 may identify the next zone along the movement path. In this way, when the mobile drive unit 510 enters and identifies the zone by reading its fiducial, the mobile drive unit 510 may assume that stopping may be prohibited and may move to the next zone.

In a further example, the path reservation module 526 may reserve, to the mobile drive unit 510 and for a first time period, a first cell that corresponds to a first zone and that is marked with the "no stop policy." The path reservation module 526 may determine that a second cell adjacent to the first cell and corresponding to a second zone is marked with a "limit number policy." Accordingly, the path reservation module 526 may reserve, to the mobile drive unit 510 and for a second time period, the second cell. Because this cell is also marked with the "limit number policy," the path reservation module 526 may also keep the second cell clear (e.g., not reserved and not occupied by) from other mobile drive units during the first time period. In this way, when the second time period starts, the mobile drive unit 510 can enter freely in the second zone without having to wait in the first zone.

The mobile drive unit 510 may receive the movement instructions 528 from the central station and travel within the workspace based on the movement path specified in the movement instructions 528. In an example, the mobile drive unit 510 may host a location determination module 512 and a management module 514. Upon entry to a zone, the mobile drive unit 510 may read the fiducial located in that zone. The location determination module 512 may determine, based on the fiducial, location information of the mobile drive unit 510 within the workspace. The location information may identify the current location or the current zone itself in which the mobile drive unit is present. The current zone may be identified by reading the fiducial. To identify the current location, various techniques may be possible. In one technique, the fiducial encodes the location information. Accordingly, the location determination module 512 may determine the current location by decoding the information encoded in the fiducial. In another technique, the fiducial identifies the zone instead. Accordingly, the location determination module 512 may use the identifier read from the fiducial to look-up a local copy or a version of the map 522 and retrieve the current location. Additionally or alternatively, the location determination module 512 may report the identifier to the central station 520 and receive, in response, the current location.

The management module 514 may receive, from the location determination module 512, the location information and may determine, from the movement instructions 528, the next zone to enter given the location information. For example, the management module 514 may identify the next zone from the sequence specified in the movement instructions 528. The management module 514 may also identify the next location of the next zone from the movement instructions 528 if available and, otherwise, from the local copy or version of the map 522 or based on a data exchange with the central station 520. The management module 514 may direct other components of the mobile drive unit 510 to cause movement of the mobile drive unit 510 from the current zone to the next zone as further illustrated in FIGS. 12-14.

Figure 6:
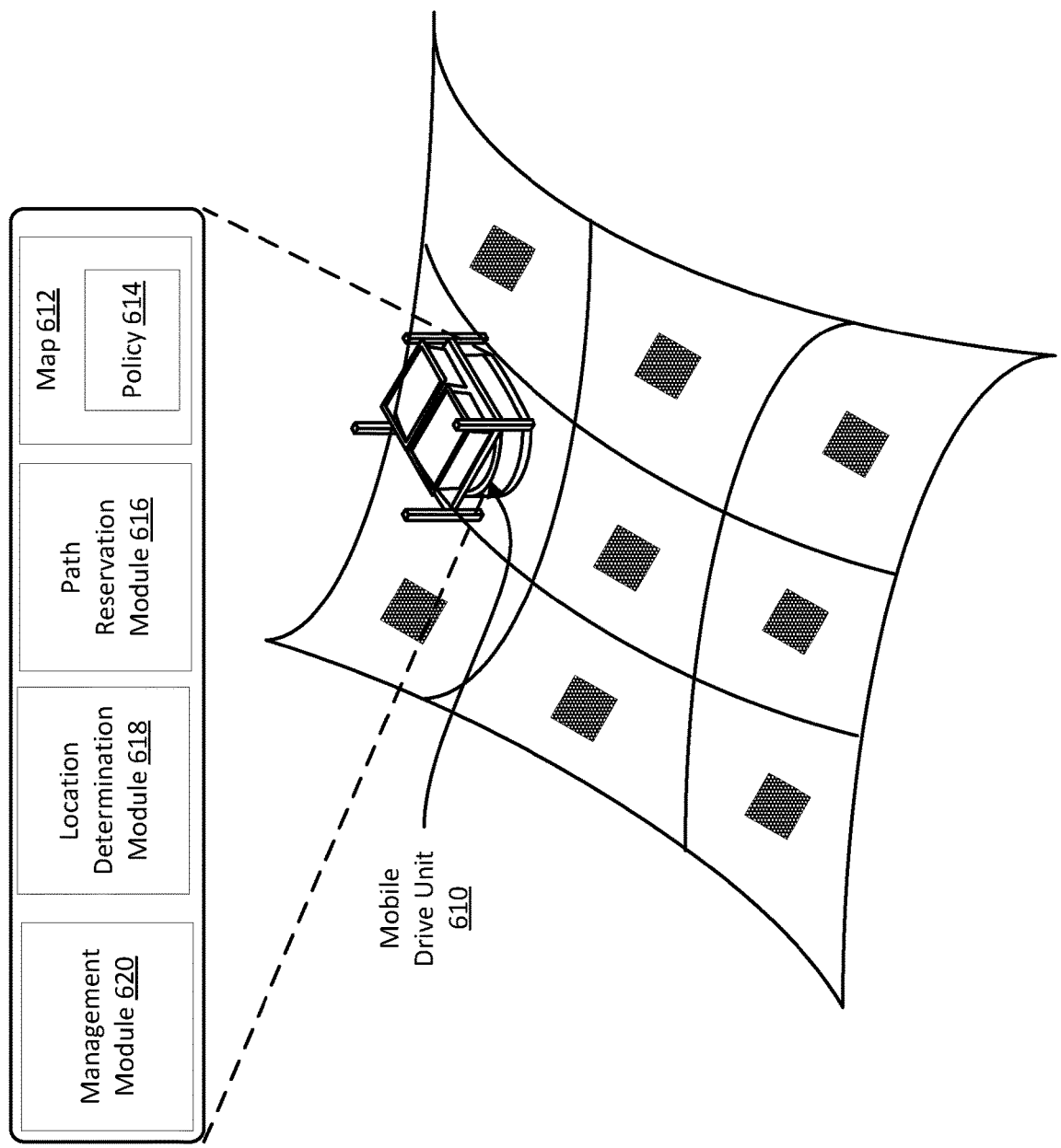
FIG. 6 illustrates an example of a mobile drive unit that autonomously moves within a workspace based on a map that defines a policy, according to certain embodiments of the present disclosure.

FIG. 6 illustrates an example of a mobile drive unit 610 that autonomously moves within a workspace based on a map 612 that defines a policy 614. Here, the floor of the workspace may be also divided in a grid of zones. However, rather than relying on a data exchange with a central station for its movement, the mobile drive unit 610 may generate its own movement path to be in compliance with the policy 614.

In an example, the mobile drive unit 610 has access (e.g., stores locally) to the map 612. In addition, the mobile drive unit 610 may host a path reservation module 616, a location determination module 618, and a management module 620. The operations of the path reservation module 616 may be similar to those of the path reservation module 526 of FIG. 5. In particular, the path reservation module 526 may access the map and identify a sequence of zones that the mobile drive unit 610 should travel, where the sequence may be compatible with the different sub-policies as marked in the map 612. Further, the path reservation module 526 may reserve each zone in the sequence for a period of time by transmitting a notification about the reservation to a central station or to any other mobile drive units within the workspace. In this way, the central station and/or other mobile drive units may become aware of the reserved zones and may avoid using these zones during the corresponding time periods.

Likewise, the operations of the location determination module 618 and management module 620 may be similar to those of the location determination module 512 and management module 514 of FIG. 5, respectively. The location determination module 618 may determine the current zone and/or the current location of this zone in which the mobile drive unit 610 is present. The management module 620 may determine the next zone and/or the next location that the mobile drive unit should move to given the movement path and may direct various components of the mobile drive unit 610 to perform the movement.

Figure 7:
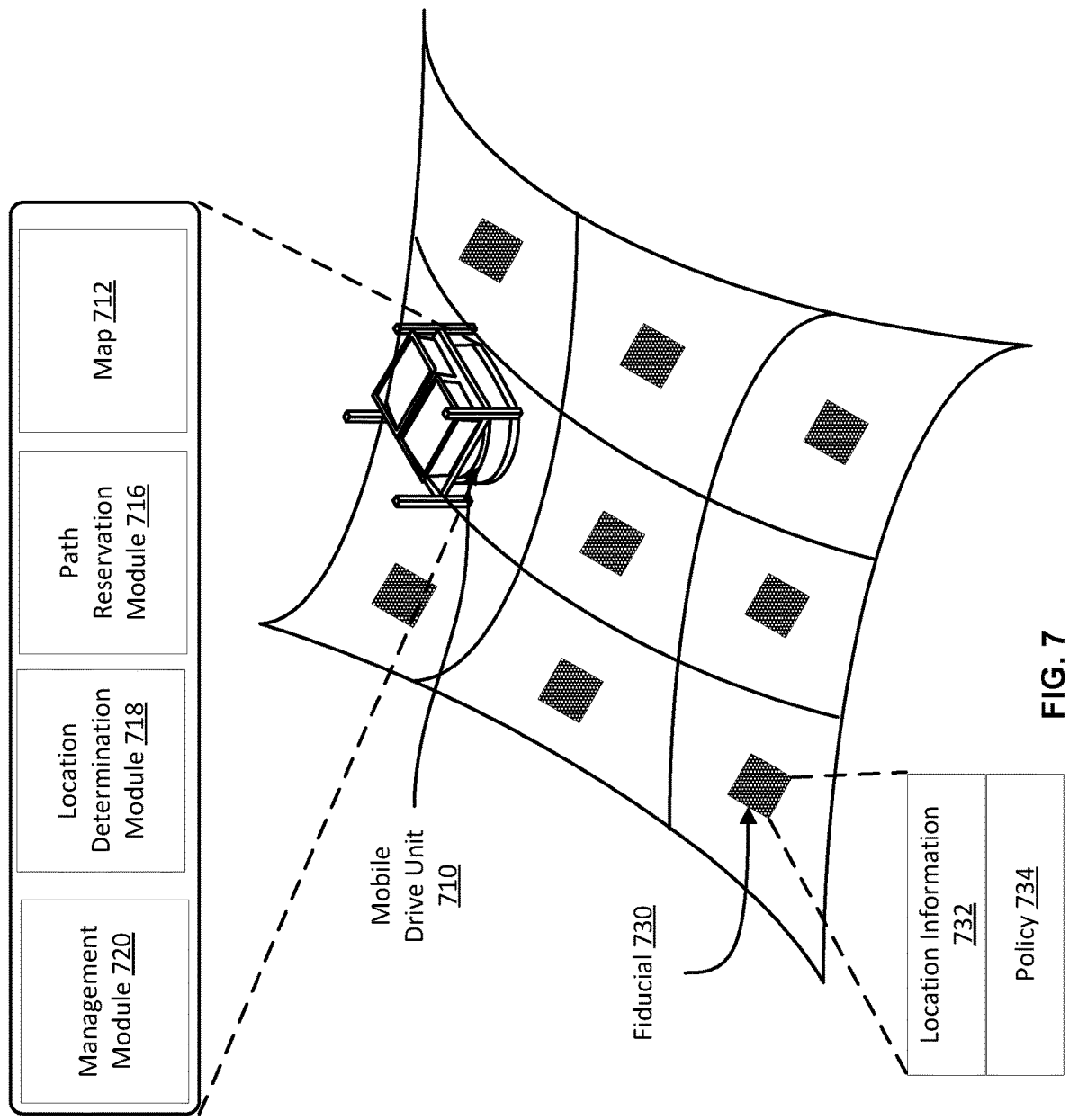
FIG. 7 illustrates an example of a mobile drive unit that autonomously moves within a workspace based on a map that may not define a policy, according to certain embodiments of the present disclosure.

FIG. 7 illustrates an example of a mobile drive unit 710 that autonomously moves within a workspace based on a map 712 that may define a policy. Here, the floor of the workspace may be also divided in a grid of zones. However, a fiducial 730 is used as a means to associate a policy 734 (or relevant portion thereof) with a location in the workspace (e.g., with a zone). For example, the fiducials encode the applicable portions of the policy 734, such that the policy need not be defined in the map 712 available to the mobile drive unit 710.

In an example, a different map is available to a central station or some other computing system (not shown). This map may mark each cell where the policy 734 applies and may be used to manufacture (e.g., print) the fiducials 730. Accordingly, each fiducial 730 may encode location information 732 of the zone in which it is affixed (such as a unique identifier or the specific location of the zone) and the sub-policy(ies) applicable to the zone. For instance, if a zone is subject to a "reject all policy," "no stop," and/or "limit number policy," its fiducial encodes an identifier(s) of the applicable sub-policy(ies).

In an example, to associate a location with the policy 734, a fiducial 730 at that location may encode a relevant portion(s) of the policy 734. The encoding may follow different techniques. In one technique, the policy 734 is physically encoded in the fiducial 730. For example, the fiducial 730 may include a barcode that, when read and decoded by the mobile drive unit 710, specifies the rules of the policy 734 (e.g., that the mobile drive unit 710 cannot stop in the zone). In a second technique, the encoding may be virtual. In one illustration of this second technique, the fiducial 730 may include an identifier of the policy 734. The mobile drive unit 710 may read the identifier from the fiducial 730 and use the identifier to access the policy 734 from a data storage location (e.g., from a table stored locally to or remotely form the mobile drive unit 710). In another illustration of the second technique, the fiducial 730 may also include an identifier. However here, the identifier is associated with a physical location, and the physical location may be associated virtually with the policy 734 (e.g., in a map). The mobile drive unit 710 may read and use the identifier from the fiducial 730 to identify the physical location, and may use the identifier of the physical location to access the policy 734.

The mobile drive unit 710 may access the map 712. In addition, the mobile drive unit 710 may host a path reservation module 716, a location determination module 718, and a management module 720 similar to the path reservation module 616, location determination module 618, and management module 620 of FIG. 6, respectively. Accordingly, once the mobile drive unit 710 is about to enter or actually enters a zone and the corresponding fiducial is read, the path reservation module 716 may decode the fiducial and determine the applicable sub-policy(ies). Information about the applicable sub-policy(ies) may be provided to the management module 720 and may identify whether the mobile drive unit 710 is permitted to enter or stop in the zone. The management module 720 may direct various components of the mobile drive unit 710 to enter or move within the zone accordingly.

FIG. 8 illustrates an example of a mobile drive unit 810 that autonomously moves within a workspace absent a grid of zones within the workspace. Here, mobile drive unit 810 may have access to a map 812 that defines a policy 814, similarly to the map 612 and policy 614 of FIG. 6, respectively. In addition, the mobile drive unit 810 may host a path reservation module 816, a location determination module 818, and a management module 820 similar to the path reservation module 616, location determination module 618, and management module 620 of FIG. 6, respectively.

In an example, the mobile drive unit 810 may not rely on fiducial affixed to zones in the workspace. Instead, the mobile drive unit 810 may determine its current location based on a number of techniques. These techniques may rely on the map 812. In one example technique, the location determination module 818 may use location triangulation to compute location information or may be equipped with a global satellite system (GPS) device to receive the location information and may use this location information to access the map 812, determine its location in the workspace, and the applicable sub-policy(ies) to that location. In another example technique, the location determination module 818 may use object recognition to detect an object in the workspace, use sensed data about the object to look up the map 812 and determine its location in the workspace. Accordingly in this technique, the map 812 may store detectable features about various objects located within the workspace, in addition to the policy 814. Once the applicable policy(ies) is identified, the management module 820 may direct operations of the various components of the mobile drive unit 810 at that location.

FIG. 9 illustrates an example flow for using a map to control movement of a mobile drive unit, where the map defines a policy for the movement within a workspace and associates a volume of the workspace with the policy. The flow may be similarly applicable to control any other type of operations of the mobile drive unit, where these operations may rely on the mobility of the mobile drive unit and may be subject to fire or other requirements. A computer system may be configured to perform the illustrative flows. For example, the computer system can include the central station 120 of FIG. 1, in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. The combination of each programmable module with the processor represents a means for performing a respective operation(s). While the operations are illustrated in a particular order, it should be understood that no particular order is necessary and that one or more operations may be omitted, skipped, and/or reordered.

The example flow of FIG. 9 may start at operation 902, where the computer system may access the map of the workspace. The map define the policy for the movement of the mobile drive unit within the workspace based on a volume of the workspace being associated with a fire shutter. For example, the map may represent the fire shutter as an object and may mark the volume(s) impacted utilized by at least a portion of the fire shutter in the open position, shut position, and transition between the open and shut positions as being subject to the policy. The policy may include multiple sub-policies, such as a "reject all policy," a "no stop policy," a "limit number policy," a "speed policy," a "towing policy," a "direction of traffic policy," and other sub-policies that impact how the mobile drive unit may utilize any of the marked volumes. In an example, the computer system may access the map from local storage or from a remote network storage location based on an event associated with transporting material from a location of the workspace. For instance, a customer may order an item inventoried in the workspace. The computer system may receive information about this order (e.g., an identifier of the item, location in the workspace, time to fulfill the order) and may, in response, access the map to deploy the mobile drive unit to the location for a pick-up and transportation of the item.

At operation 904, the computer system may generate at least a portion of a movement path for the mobile drive unit within the workspace based on the map and on the event for transporting material from the location in the workspace. In an example, the portion of the movement path may be in compliance with the policy defined in the map. For instance, the portion may include a volume (or a zone, if a grid of zones is available) represented in the map (e.g., as an object, or as a cell if the grid is available). If the volume is subject to any sub-policy, the computer system may identify the volume and generate instructions about moving through the volume in accordance with each applicable sub-policy. Further, the movement path may include a sequence of volumes, thereby defining a flow through these volumes. The computer system may generate the movement path such that co-linearity and bi-directionality policies are observed. The computer system may reserve the movement path for the mobile drive unit. Accordingly, if the movement path involves a volume subject to the "limit number policy," the computer system may ensure that the number of other mobile drive units is within the specified limit during the relevant travel time period of the mobile drive unit along the movement path.

At operation 906, the computer system may provide at least the portion of the movement path to the mobile drive unit over a data network. For example, the computer system may send, to the mobile drive unit over the data network, information that identifies the sequence of the movement path to the mobile drive unit and may include restrictions specific to particular volumes based on the policy.

At operation 908, the computer system may determine non-compliance of the movement of the mobile drive unit along the portion of the movement path. In an example, the computer system may receive, from the mobile drive unit or from another mobile drive unit based on a data exchange over the data network, that the mobile drive unit is performing an operation in a volume, where the operation is not in compliance with a sub-policy. For instance, the computer system may receive information indicating that the mobile drive unit broke down or failed in a volume subject to the "no stop policy."

At operation 910, the computer system may instruct a second mobile drive unit to tow the mobile drive unit at a priority higher than a priority of material transportation based on the non-compliance and on the policy specifying the towing and the priority. For example, the "towing policy" may specify that moving the mobile drive away from the volume subject to the "no stop policy" should have the higher priority and that this policy overrides the "no stop policy" and "limit number policy" when in effect. Accordingly, the computer system may generate and send instructions to the second mobile drive unit over the data network to tow the mobile drive unit. The instructions may identify the mobile drive unit, the volume where the mobile drive unit is performing the non-compliant operation, the priority, and/or any additional clean-up operations (e.g., to remove any material left behind the mobile drive unit in that volume).

FIG. 10 illustrates an example flow for controlling movement of a mobile drive unit based on a map of a workspace and on a policy for the movement within a workspace. The flow may be similarly applicable to control any other type of operations of the mobile drive unit, where these operations may rely on the mobility of the mobile drive unit and may be subject to fire or other requirements. A computer system hosted on the mobile drive unit may be configured to perform the illustrative flows. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represent a means for performing a respective operation(s). While the operations are illustrated in a particular order, it should be understood that no particular order is necessary and that one or more operations may be omitted, skipped, and/or reordered.

The example flow of FIG. 10 may start at operation 1002, where the mobile drive unit may determine information about a location of the mobile drive unit within the workspace. Various techniques are available for detecting the location, as described in connection with FIGS. 5-8. In one example, fiducials affixed to zones of the workspace may be used. In another example, location triangulation, GPS data, or object recognition may be used to determine the location.

At operation 1004, the mobile drive unit may determine at least a portion of a movement path within the workspace based on the information about the location and on the map. The portion may include a volume (or a zone, if a grid of zones is available) subject to a policy. Various techniques are available for determining the portion, as described in connection with FIGS. 5-8. In one example, the mobile drive unit may receive the portion from a central station that has access to the map. In this example, the map may identify the volumes of the workspace that are subject to the policy. In another example, the mobile drive unit may access the map from local storage or from a remote storage location and may look-up the applicable policy based on the location information. In this example, the mobile drive unit may generate the movement path such that each portion along this movement path may be compliant with the policy. In yet another example, a fiducial affixed to a volume (or zone on the floor) may encode the applicable policy. The mobile drive unit may read the fiducial and identify the policy, and may subject its movement within that volume to the policy.

At operation 1006, the mobile drive unit may perform movement along the portion of the movement path. For example, a management module of the mobile drive unit may execute instructions relevant to the movement path and direct other components of the management module to travel along each portion of the movement path, such that the traveled portions are in compliance with the policy.

At operation 1008, the mobile drive unit may report non-compliance of the movement along the portion of the movement path. For example, upon a failure in a volume subject to a "no stop policy," the mobile drive unit may send, over a data network, information that identifies the failure and the volume to a central station or to another mobile drive unit.

At operation 1010, the mobile drive unit may facilitate tow by a second mobile drive unit. For example, in response to reporting the failure, the mobile drive unit may receive information that identifies the second mobile drive unit, the priority of the tow, and the expected time of arrival of the second mobile drive unit. The management module may direct the components of the mobile drive unit to support the tow (e.g., release the brakes) prior to the arrival, or upon arrival and successful identification of the second mobile drive.

FIG. 11 illustrates an example flow for generating a map that defines a policy associated with movement of a mobile drive unit within a workspace. The flow may be similarly applicable to control any other type of operations of the mobile drive unit, where these operations may rely on the mobility of the mobile drive unit and may be subject to fire or other requirements. A computing device of an end user may be configured to perform the illustrative flows. Instructions for performing the operations of the illustrative flows can be stored as computer-readable instructions on a non-transitory computer-readable medium of the computing device. As stored, the instructions represent programmable modules that include code or data for a map editing application executable by a processor(s) of the computing device. The execution of such instructions configures the computing device to perform the specific operations shown in the figures and described herein. Each programmable module in combination with the processor represent a means for performing a respective operation(s). While the operations are illustrated in a particular order, it should be understood that no particular order is necessary and that one or more operations may be omitted, skipped, and/or reordered.

The example flow of FIG. 1 may start at operation 1102, where the computing device may present a map of a workspace and an option to add a fire shutter to the map. The fire shutter may be represented as an object having particular dimensions in particular operational states (e.g., open, shut, and transition). In an example, the map may be presented on a user interface (e.g., a display) of the computing device in an interactive mode to allow edits thereto based on user input. The map may have been generated from a template map based on populating the template map with objects representing various equipment in the workspace. The option may be displayed as a graphical user interface (GUI) element that allows the end user to add the object representing the fire shutter to the map. The addition may be manual, where the end user specifies the location of this object on the map (e.g., based on a drag and drop operation) and the particular dimensions. Alternatively, the addition may be partially automated, where the end user specifies the location of this object on the map (e.g., based on a drag and drop operation) and, in response, the particular dimensions are determined from a pre-stored template associated with the fire shutter.

At operation 1104, the computing device may update the map to add the object based on a user selection of the option. For example, the computing device may add the object or a reference thereto to the location defined in the map and may identify cells (or portions of space within the workspace represented in the map) as being impacted by the fire shutter in its operational states.

At operation 1106, the computing device may provide an option to select a policy to apply to the map. In an example, this option may also be presented as a GUI element on the computing device. Various types of this options may be possible. One example type may be a manual option. In particular, the end user may provide user input that specifies the policy and that marks the cells where this policy is applicable. Another example type may be semi-automated. The option may provide various selectable policies (or sub-policies). The user input may select one or more of such policies and may mark the affected cells. Yet another example type may be automated. Based on the dimensions of the fire shutter and the operational states, the computing device may automatically select the applicable policy(ies) and may mark the affected cells.

At operation 1108, the computing device may update the map to indicate that the policy applies to a volume associated with the object representing the fire shutter. For example, in response to the user input provided via the option at operation 1106, the computing device may mark the cells on the map that may be affected by the applicable policy(ies).

At operation 1110, the computing device may validate that the map is compliance with the policy. For example, the computing device may determine whether each cell affected by the fire shutter door in an operational state has been marked as subject to the policy. The computing device may also determine whether a flow of movement through multiple cells may meet co-linearity and bi-directionality policies. Further, the computing device may simulate the flow of multiple mobile drive units within the workspace in normal and emergency operations based on the map and the policy to determine compliance with fire requirements. If a violation is detected, the computing device may present information about this violation to the end user.

In an example, validating the map may include multiple checks. For instance, if the "no stop policy" covers more than three fiducials (e.g., three cells), the computing device may report an error. If the "no stop policy" occupies either a queue, storage, or charger fiducial (e.g., fiducial located in a zone that contains a charging station for charging the power of one or more mobile drive units), the computing device may report an error. If the fiducials that the "no stop policy" occupies are not co-linear, the computing device may report an error. If the "no stop policy" overlaps any other policy, the computing device may report an error. The computing device may also check whether a fire shutter does not have an associated "no stop policy" and whether a "no stop policy" is not associated with a fire shutter. In either case, the computing device may report an error. Further, the computing device may check that the "limit number" is applied within a reasonable distance from (e.g., around the edges of cells marked with) the "no stop policy" and report a failure if any is not.

At operation 1112, the computing device may store the map in a data storage space. For example, the map may be stored locally on the device or may be uploaded to a central station. At operation 1114, the computing device may publish the map from storage. For example, the computing device may provide a GUI option to "submit" the map. Upon this submission, the central station may start using the map and/or may distribute the map to mobile drive units available within the workspace.

Figure 12:
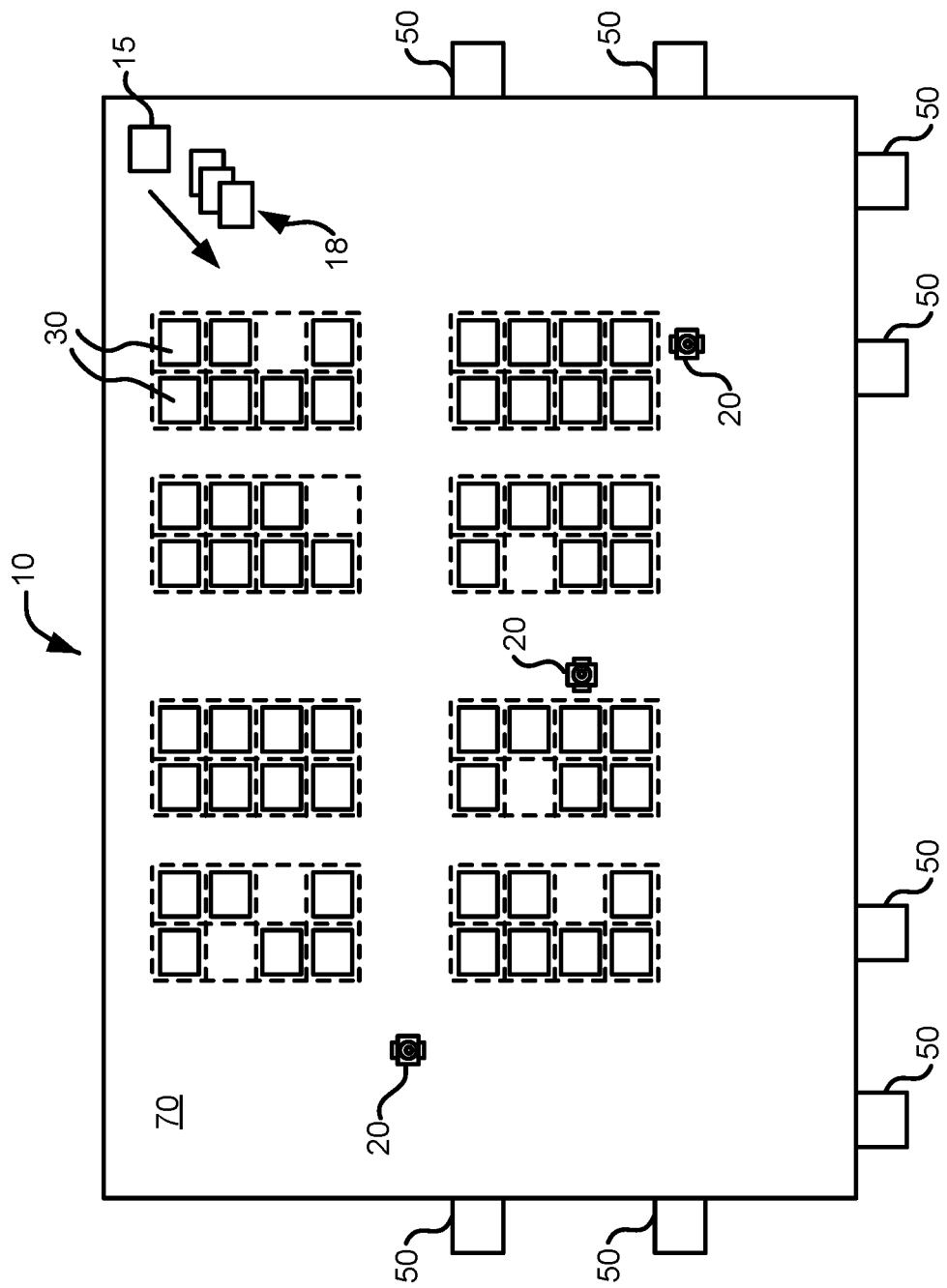
FIG. 12 illustrates components of an inventory system, according to certain embodiments of the present disclosure.

FIG. 12 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15 (e.g., a central station). Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 12 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. In some embodiments, workspace 70 includes multiple floors, and some combination of ramps, elevators, conveyors, and/or other devices are provided to facilitate movement of mobile drive units 20 and/or other components of the inventory system 10 between the multiple floors. Although FIG. 12 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 12 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 13:
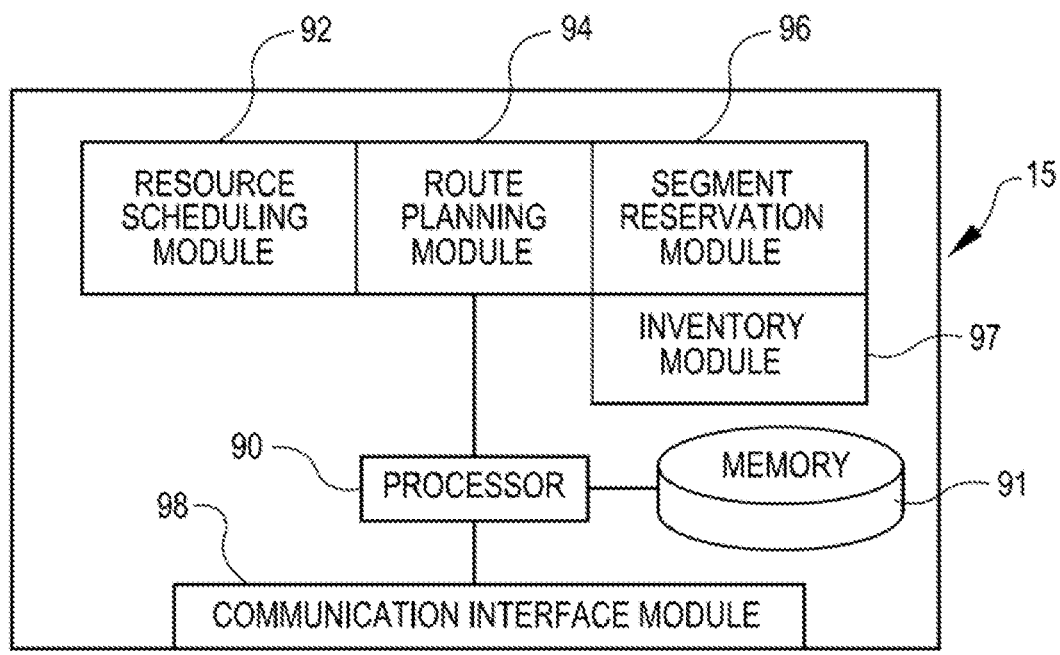
FIG. 13 illustrates in greater detail the components of an example central station, according to certain embodiments of the present disclosure.

FIG. 13 illustrates in greater detail the components of a particular embodiment of management module 15 (e.g., a central station). As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices, or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish, or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

FIG. 14 illustrates in greater detail the components of a particular embodiment of mobile drive unit. In particular, FIG. 14 includes a front and side view of an example mobile drive unit. The mobile drive unit includes a docking head 1410, a drive module 1420, a docking actuator 1430, and a control module 1470. Additionally, the mobile drive unit may include one or more sensors configured to detect or determine the location of mobile drive unit, inventory holder 30, and/or other appropriate elements of inventory system 10. In the illustrated embodiment, the mobile drive unit includes a position sensor 1440, a holder sensor 1450, an obstacle sensor 1460, and an identification signal transmitter 1462.

Docking head 1410, in particular embodiments of mobile drive unit, couples mobile drive unit to inventory holder 30 and/or supports inventory holder 30 when mobile drive unit is docked to inventory holder 30. Docking head 1410 may additionally allow mobile drive unit to maneuver inventory holder 30, such as by lifting inventory holder 30, propelling inventory holder 30, rotating inventory holder 30, and/or moving inventory holder 30 in any other appropriate manner. Docking head 1410 may also include any appropriate combination of components, such as ribs, spikes, and/or corrugations, to facilitate such manipulation of inventory holder 30. For example, in particular embodiments, docking head 1410 may include a high-friction portion that abuts a portion of inventory holder 30 while mobile drive unit is docked to inventory holder 30. In such embodiments, frictional forces created between the high-friction portion of docking head 1410 and a surface of inventory holder 30 may induce translational and rotational movement in inventory holder 30 when docking head 1410 moves and rotates, respectively. As a result, the mobile drive unit may be able to manipulate inventory holder 30 by moving or rotating docking head 1410, either independently or as a part of the movement of mobile drive unit as a whole.

Drive module 1420 propels mobile drive unit and, when mobile drive unit and inventory holder 30 are docked, inventory holder 30. Drive module 1420 may represent any appropriate collection of components operable to propel mobile drive unit. For example, in the illustrated embodiment, drive module 1420 includes motorized axle 1422, a pair of motorized wheels 1424, and a pair of stabilizing wheels 1426. One motorized wheel 1424 is located at each end of motorized axle 1422, and one stabilizing wheel 1426 is positioned at each end of mobile drive unit.

Docking actuator 1430 moves docking head 1410 towards inventory holder 30 to facilitate docking of mobile drive unit and inventory holder 30. Docking actuator 1430 may also be capable of adjusting the position or orientation of docking head 1410 in other suitable manners to facilitate docking. Docking actuator 1430 may include any appropriate components, based on the configuration of mobile drive unit and inventory holder 30, for moving docking head 1410 or otherwise adjusting the position or orientation of docking head 1410. For example, in the illustrated embodiment, docking actuator 1430 includes a motorized shaft (not shown) attached to the center of docking head 1410. The motorized shaft is operable to lift docking head 1410 as appropriate for docking with inventory holder 30.

Drive module 1420 may be configured to propel mobile drive unit in any appropriate manner. For example, in the illustrated embodiment, motorized wheels 1424 are operable to rotate in a first direction to propel mobile drive unit in a forward direction. Motorized wheels 1424 are also operable to rotate in a second direction to propel mobile drive unit in a backward direction. In the illustrated embodiment, drive module 1420 is also configured to rotate mobile drive unit by rotating motorized wheels 1424 in different directions from one another or by rotating motorized wheels 1424 at different speeds from one another.

Position sensor 1440 represents one or more sensors, detectors, or other components suitable for determining the location of mobile drive unit in any appropriate manner. For example, in particular embodiments, the workspace 70 associated with inventory system 10 includes a number of fiducial marks that mark points on a two-dimensional grid that covers all or a portion of workspace 70. In such embodiments, position sensor 1440 may include a camera and suitable image- and/or video-processing components, such as an appropriately-programmed digital signal processor, to allow position sensor 1440 to detect fiducial marks within the camera's field of view. Control module 1470 may store location information that position sensor 1440 updates as position sensor 1440 detects fiducial marks. As a result, position sensor 1440 may utilize fiducial marks to maintain an accurate indication of the location mobile drive unit and to aid in navigation when moving within workspace 70.

Holder sensor 1450 represents one or more sensors, detectors, or other components suitable for detecting inventory holder 30 and/or determining, in any appropriate manner, the location of inventory holder 30, as an absolute location or as a position relative to mobile drive unit. Holder sensor 1450 may be capable of detecting the location of a particular portion of inventory holder 30 or inventory holder 30 as a whole. The mobile drive unit may then use the detected information for docking with or otherwise interacting with inventory holder 30.

Obstacle sensor 1460 represents one or more sensors capable of detecting objects located in one or more different directions in which mobile drive unit is capable of moving. Obstacle sensor 1460 may utilize any appropriate components and techniques, including optical, radar, sonar, pressure-sensing and/or other types of detection devices appropriate to detect objects located in the direction of travel of mobile drive unit. In particular embodiments, obstacle sensor 1460 may transmit information describing objects it detects to control module 1470 to be used by control module 1470 to identify obstacles and to take appropriate remedial actions to prevent mobile drive unit from colliding with obstacles and/or other objects.

Obstacle sensor 1460 may also detect signals transmitted by other mobile drive units 20 operating in the vicinity of the illustrated mobile drive unit. For example, in particular embodiments of inventory system 10, one or more mobile drive units 20 may include an identification signal transmitter 1462 that transmits a drive identification signal. The drive identification signal indicates to other mobile drive units 20 that the object transmitting the drive identification signal is in fact a mobile drive unit. Identification signal transmitter 1462 may be capable of transmitting infrared, ultraviolet, audio, visible light, radio, and/or other suitable signals that indicate to recipients that the transmitting device is a mobile drive unit.

Additionally, in particular embodiments, obstacle sensor 1460 may also be capable of detecting state information transmitted by other mobile drive units 20. For example, in particular embodiments, identification signal transmitter 1462 may be capable of including state information relating to mobile drive unit in the transmitted identification signal. This state information may include, but is not limited to, the position, velocity, direction, and the braking capabilities of the transmitting mobile drive unit. In particular embodiments, the mobile drive unit may use the state information transmitted by other mobile drive units to avoid collisions when operating in close proximity with those other mobile drive units.

Control module 1470 monitors and/or controls operation of drive module 1420 and docking actuator 1430. Control module 1470 may also receive information from sensors such as position sensor 1440 and holder sensor 1450 and adjust the operation of drive module 1420, docking actuator 1430, and/or other components of mobile drive unit based on this information. Additionally, in particular embodiments, the mobile drive unit may be configured to communicate with a management device of inventory system 10 and control module 1470 may receive commands transmitted to mobile drive unit and communicate information back to the management device utilizing appropriate communication components of mobile drive unit. Control module 1470 may include any appropriate hardware and/or software suitable to provide the described functionality. In particular embodiments, control module 1470 includes a general-purpose microprocessor programmed to provide the described functionality. Additionally, control module 1470 may include all or portions of docking actuator 1430, drive module 1420, position sensor 1440, and/or holder sensor 1450, and/or share components with any of these elements of mobile drive unit.

Moreover, in particular embodiments, control module 1470 may include hardware and software located in components that are physically distinct from the device that houses drive module 1420, docking actuator 1430, and/or the other components of mobile drive unit described above. For example, in particular embodiments, each mobile drive unit operating in inventory system 10 may be associated with a software process (referred to here as a "drive agent") operating on a server that is in communication with the device that houses drive module 1420, docking actuator 1430, and other appropriate components of mobile drive unit. This drive agent may be responsible for requesting and receiving tasks, requesting and receiving routes, transmitting state information associated with mobile drive unit, and/or otherwise interacting with management module 15 and other components of inventory system 10 on behalf of the device that physically houses drive module 1420, docking actuator 1430, and the other appropriate components of mobile drive unit. As a result, for the purposes of this description and the claims that follow, the term "mobile drive unit" includes software and/or hardware, such as agent processes, that provides the described functionality on behalf of mobile drive unit but that may be located in physically distinct devices from the drive module 1420, docking actuator 1430, and/or the other components of mobile drive unit described above.

While FIG. 14 illustrates a particular embodiment of mobile drive unit containing certain components and configured to operate in a particular manner, the mobile drive unit may represent any appropriate component and/or collection of components configured to transport and/or facilitate the transport of inventory holders 30. As another example, the mobile drive unit may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, the mobile drive unit may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering, and/or otherwise controlling the position of inventory holder 30 as a result of the responsive portion of inventory holder 30. In such embodiments, the mobile drive unit may represent the responsive portion of inventory holder 30 and/or the components of inventory system 10 responsible for generating and controlling these magnetic fields. While this description provides several specific examples, the mobile drive unit may, in general, represent any appropriate component and/or collection of components configured to transport and/or facilitate the transport of inventory holders 30.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    a mobile drive unit configured for material transportation within a workspace;
    a fire shutter located within the workspace and operable to manage a spread of a fire within the workspace; and
    a computer system communicatively coupled with the mobile drive unit over a data network, the computer system comprising:
        a processor; and
        a memory storing computer-readable instructions that, upon execution by the processor, configure the computer system to:
            access a map of the workspace, the map defining a policy for movement of the mobile drive unit within the workspace based at least in part on occupation of one or more volumes of the workspace by the fire shutter in an open position, a shut position, and a transition between the open position and the shut position;
            generate a movement path for the mobile drive unit within the workspace based at least in part on the map and on an event for transporting material from a location in the workspace, the movement path being in compliance with the policy defined in the map; and
            provide the movement path to the mobile drive unit over the data network.

2. The system of claim 1, wherein the policy specifies that the movement of the mobile drive unit and storage of material are prohibited within a particular volume of the workspace occupied by the fire shutter in the open position.

3. The system of claim 1, wherein the policy specifies that the movement of the mobile drive unit is permitted and stoppage of the mobile drive unit is prohibited within a particular volume of the workspace occupied by the fire shutter in the shut position and in a transition between the open position and the shut position.

4. The system of claim 3, wherein the policy further specifies a limit on a number of mobile drive units permitted to occupy an expanded volume of the workspace, wherein the expanded volume includes the particular volume and is based at least in part on a dimension of the mobile drive unit and a direction of movement of the mobile drive unit in the particular volume.

5. A computer-implemented method, comprising:
    determining, by a mobile drive unit, information about a location of the mobile drive unit within a workspace, the mobile drive unit configured for material transportation within the workspace;
    determining, by the mobile drive unit, at least a portion of a movement path within the workspace based at least in part on the information about the location and on a map, the map defining a policy for movement of the mobile drive unit within the workspace based at least in part on one or more volumes of the workspace associated with a fire shutter, the fire shutter located within the workspace and operable to manage a spread of a fire within the workspace; and
    performing, by the mobile drive unit, movement along the portion of the movement path, the movement along the portion of the movement path being in compliance with the policy defined in the map.

6. The computer-implemented method of claim 5, wherein determining at least the portion of the movement path comprises:
    receiving, from a computer system over a data network, instructions about the portion based at least in part on the map and the information about the location of the mobile drive unit within the workspace, and wherein performing the movement comprises executing the instructions.

7. The computer-implemented method of claim 6, wherein the map represents the workspace with a visual representation that includes cells, wherein each cell corresponds to a particular volume of the workspace, wherein at least one of the cells is associated with the policy and a fiducial in the map and corresponds to a volume of the workspace that can be occupied by the fire shutter in an open position, a shut position, or a transition between the open position and the shut position, and wherein the location about the mobile drive unit is determined based at least in part on a read of the fiducial by the mobile drive unit.

8. The computer-implemented method of claim 7, wherein the instructions received from the computer system specify the movement of the mobile drive unit at least on one or more of:
    identifying the fiducial to the mobile drive unit and prohibiting the mobile drive unit from stopping within the at least one of the cells corresponding to the fiducial, or
    identifying a different fiducial in a different cell adjacent to the at least one of the cells and instructing the mobile drive unit to move to the different cell and detect the different fiducial.

9. The computer-implemented method of claim 5, wherein determining the information about the location of the mobile drive unit comprises reading, by the mobile drive unit, a fiducial associated with the location, wherein determining the portion of the movement comprises determining, by the mobile drive unit from the reading of the fiducial, that the mobile drive unit is prohibited from stopping at the location.

10. The computer-implemented method of claim 9, wherein the fiducial encodes the policy specifying that the mobile drive unit is prohibited from stopping at the location based at least in part on the map specifying that the policy is applicable to the location.

11. The computer-implemented method of claim 9, wherein the fiducial includes an identifier of the policy, and wherein determining that the mobile device is prohibited from stopping at the location comprises reading the identifier from the fiducial and accessing the policy from a data storage location based at least in part on the identifier.

12. The computer-implemented method of claim 5, wherein determining, at least a portion of the movement path within the workspace comprises:
    accessing, by the mobile drive unit, the map;
    determining, by the mobile drive unit, that the map specifies that the policy is applicable to the location; and generating, by the mobile drive unit, the portion of the movement path in compliance with the policy.

13. The computer-implemented method of claim 5, wherein the policy specifies at least one of:
- movement of the mobile drive unit and storage of material are prohibited within a first volume of the workspace occupied by the fire shutter in an open position,
- the movement of the mobile drive unit is permitted and stoppage of the mobile drive unit is prohibited within a second volume of the workspace occupied by the fire shutter in a transition between the open position and a shut position, or
- a limit on a number of mobile drive units permitted to occupy a third volume of the workspace, wherein the third volume comprises the second volume and is defined based at least in part on a dimension of the mobile drive unit.

14. A computer-readable storage medium comprising computer-readable instructions that, upon execution on a computer system, configure the computer system to perform operations comprising:
- accessing a map of a workspace, the map defining a policy for movement of a mobile drive unit within the workspace based at least in part on one or more volumes of the workspace associated with a fire shutter, the fire shutter located within the workspace and operable to manage a spread of a fire within the workspace;
- generating at least a portion of a movement path for the mobile drive unit within the workspace based at least in part on the map and on an event for transporting material from a location in the workspace, the portion of the movement path being in compliance with the policy defined in the map; and
- providing at least the portion of the movement path to the mobile drive unit over a data network.

15. The computer-readable storage medium of claim 14, wherein the map indicates that the policy is applicable to a first volume and to a second volume of the workspace associated with at least one of the fire shutter, and wherein generating at least the portion of the movement path comprises generating instructions that specify a flow of the movement of the mobile drive unit through the first volume and the second volume based at least in part on the policy.

16. The computer-readable storage medium of claim 14, wherein the map is updated based at least in part on an emergency, and wherein an update to the map comprises a change to a policy type applied to the one or more volumes.

17. The computer-readable storage medium of claim 14, wherein the map represents the fire shutter as an object dimensioned based at least in part on dimensions of the fire shutter, wherein the map represents the one or more volumes as one or more cells in the map, and wherein the map specifies that the policy is applicable to a number of cells based at least in part on the dimensions of the fire shutter and respective dimensions of the cells.

18. The computer-readable storage medium of claim 14, wherein the operations further comprise:
- instructing a second mobile drive unit to tow the mobile drive unit at a priority higher than a priority of material transportation based at least in part on a determination of a stoppage of the mobile drive unit in the one or more volumes, and wherein towing the mobile drive unit overrides the policy for the movement of the mobile drive unit.

19. The computer-readable storage medium of claim 14, wherein the map identifies that the policy is applicable to the one or more volumes, and wherein the policy specifies at least a speed of the movement of the mobile drive unit within the one or more volumes and a direction of the movement.

20. The computer-readable storage medium of claim 14, wherein the map comprises multiple layers, represents a first volume subject to the policy as a first cell having predefined dimensions in a first layer of the map, and represents a second volume that contains the first volume as a second cell in a second layer of the map, and wherein the map indicates that the policy is applicable to the second cell in the second layer.

* * * * *